United States Patent
Wang et al.

(10) Patent No.: US 12,372,634 B2
(45) Date of Patent: Jul. 29, 2025

(54) SIGNAL SENDING METHOD, SIGNAL PROCESSING METHOD, AND RADAR APPARATUS

(71) Applicant: Shenzhen Yinwang Intelligent Technologies Co., Ltd., Shenzhen (CN)

(72) Inventors: Yikai Wang, Chengdu (CN); Qian Yin, Chengdu (CN); Ting Li, Shanghai (CN)

(73) Assignee: Shenzhen Yinwang Intelligent Technologies Co., Ltd., Shenzhen (CN)

(*) Notice: Subject to any disclaimer, the term of this patent is extended or adjusted under 35 U.S.C. 154(b) by 377 days.

(21) Appl. No.: 17/709,228

(22) Filed: Mar. 30, 2022

(65) Prior Publication Data
US 2022/0221569 A1 Jul. 14, 2022

Related U.S. Application Data

(63) Continuation of application No. PCT/CN2020/117876, filed on Sep. 25, 2020.

(30) Foreign Application Priority Data

Sep. 30, 2019 (CN) .......................... 201910945492.4

(51) Int. Cl.
*G01S 13/34* (2006.01)
*G01S 7/40* (2006.01)

(52) U.S. Cl.
CPC .......... *G01S 13/343* (2013.01); *G01S 7/4065* (2021.05)

(58) Field of Classification Search
CPC ...... G01S 13/343; G01S 7/4065; G01S 7/282; G01S 7/0234; G01S 13/42; G01S 13/58; G01S 13/581; G01S 7/0235; G01S 7/285
See application file for complete search history.

(56) References Cited

U.S. PATENT DOCUMENTS 9,509,382 B1 11/2016 Nabar et al.
10,890,652 B2 * 1/2021 Kishigami ............ G01S 13/288
(Continued)

FOREIGN PATENT DOCUMENTS

CN 103299207 A 9/2013
CN 104076351 A 10/2014
(Continued)

OTHER PUBLICATIONS

Enhancement_of_Doppler_Unambiguity_for_Chirp-Sequence_Modulated_TDM-MIMO_Radars.pdf (Year: 2018).*
(Continued)

*Primary Examiner* — Ladimir Magloire
*Assistant Examiner* — Yonghong Li
(74) *Attorney, Agent, or Firm* — Leydig, Voit & Mayer, Ltd.

(57) ABSTRACT

A signal sending method, a signal processing method, and a radar apparatus are provided which are, related to sensor technologies. The radar apparatus includes at least three transmit antennas. The signal sending method includes: determining at least two transmit antenna groups of the radar apparatus, wherein each transmit antenna group includes at least one transmit antenna; sending signals by using the at least two transmit antenna groups, wherein the at least two transmit antenna groups send signals in a TDM manner, and a plurality of transmit antennas included in each transmit antenna group including a plurality of transmit antennas in the at least two transmit antenna groups send signals in a CDM manner. Embodiments of this application may be applied to related fields such as autonomous driving, assisted driving, intelligent driving, intelligent connected vehicle, intelligent vehicle, and electric mobile/electric vehicle.

19 Claims, 12 Drawing Sheets

(56) References Cited

U.S. PATENT DOCUMENTS

| | | | | |
|---|---|---|---|---|
| 2005/0128132 A1* | 6/2005 | Ziller | ............... | G01S 7/034 |
| | | | | 342/175 |
| 2014/0368374 A1* | 12/2014 | Choi | ............... | G01S 13/42 |
| | | | | 342/175 |
| 2015/0061915 A1* | 3/2015 | Kishigami | ............ | G01S 13/288 |
| | | | | 342/385 |
| 2016/0204840 A1* | 7/2016 | Liu | ............... | H04B 7/0413 |
| | | | | 375/267 |
| 2019/0265347 A1* | 8/2019 | Wintermantel | ...... | H01Q 1/3283 |

FOREIGN PATENT DOCUMENTS

| | | |
|---|---|---|
| CN | 104348763 A | 2/2015 |
| CN | 105759271 A | 7/2016 |
| CN | 107688178 A | 2/2018 |
| CN | 107870327 A | 4/2018 |
| CN | 108120957 A | 6/2018 |
| CN | 108120965 A | 6/2018 |
| CN | 108291832 A | 7/2018 |
| CN | 108594233 A | 9/2018 |
| CN | 109343053 A | 2/2019 |
| CN | 110168400 A | 8/2019 |
| CN | 112578341 A | 3/2021 |
| DE | 102013210256 A1 | 12/2014 |
| DE | 102020111533 A1 | 10/2021 |
| EP | 3179266 A1 | 6/2017 |
| EP | 3309577 A2 | 4/2018 |
| KR | 20040063013 A | 7/2004 |
| WO | 2015028175 A1 | 3/2015 |
| WO | 2017061933 A1 | 4/2017 |

OTHER PUBLICATIONS

Systematic_Phase_Correction_for_Direction-of-Arrival_Estimation_in_Spectrally_Interleaved_OFDM_MIMO_Radar.pdf (Year: 2019).*

Kim et al., "Random phase code for automotive MIMO radars using combined frequency shift keying-linear FMCW waveform," IET Radar and Sonar Navigation, vol. 12 Iss. 10, pp. Total 6 pages (2018).

Sit et al., "BPSK-based MIMO FMCW Automotive-Radar Concept for 3D Position Measurement," Proceedings of the 15th European Radar Conference, 2018 EuMA, Madrid, Spain, Total 4 pages (Sep. 2018).

Roos et al., "Enhancement of Doppler Unambiguity for Chirp-Sequence Modulated TDM-MIMO Radars," 2018 IEEE MTT-S International Conference on Microwaves for Intelligent Mobility (ICMIM), Total 4 pages, Institute of Electrical and Electronics Engineers, New York, New York (Oct. 2018).

Schmid et al., "Motion Compensation and Efficient Array Design for TDMA FMCW MIMO Radar Systems," 6th European Conference on Antennas and Propagation (EUCAP), IEEE, Total 5 pages Institute of Electrical and Electronics Engineers, New York, New York (2011).

* cited by examiner

SIGNAL SENDING METHOD, SIGNAL PROCESSING METHOD, AND RADAR APPARATUS

CROSS-REFERENCE TO RELATED APPLICATIONS

This application is a continuation of International Application No. PCT/CN2020/117876, filed on Sep. 25, 2020, which claims priority to Chinese Patent Application No. 201910945492.4, filed on Sep. 30, 2019. The disclosures of the aforementioned applications are hereby incorporated by reference in their entireties.

TECHNICAL FIELD

Embodiments of this application relate to the field of radar technologies, and in particular, to a signal sending method, a signal processing method, and a radar apparatus.

BACKGROUND

With development of science and technologies, an intelligent vehicle gradually enters daily life. An advanced driver assistant system (ADAS) plays a very important role in the intelligent vehicle. In the system, various sensors mounted on the vehicle are used to sense an ambient environment and collect data in a driving process of the vehicle, to recognize, detect, and track an object, and the like, so that a driver becomes aware of a possible danger in advance, and driving comfort and safety of the vehicle are increased effectively.

In an automated driving technology, a sensor layer includes a vision sensor such as a vehicle-mounted camera and a radar sensor such as vehicle-mounted radar. Millimeter-wave radar is a type of vehicle-mounted radar, and is widely applied to an automated driving system because of low costs and a relatively mature technology. In the automated driving technology, there is a requirement for higher resolution of the millimeter-wave radar, and high lateral resolution of the radar can be achieved by increasing an antenna aperture. Multi-input multiple-output (MIMO) is a technical means to increase the antenna aperture, so that MIMO radar becomes a development direction of the vehicle-mounted millimeter-wave radar.

The MIMO radar mainly has several specific implementations: frequency division multiplexing (FDM), code division multiplexing (CDM), and time division multiplexing (TDM). In consideration of implementation complexity and a limitation from costs of a semiconductor device, a TDM technology is mostly used for the vehicle-mounted millimeter-wave radar. However, in actual use of TDM MIMO, a phase change amount caused by a Doppler frequency of a moving target in a switching time of different transmit antennas is coupled to each virtual transceiver antenna, and a sampling rate of the TDM MIMO is reduced in a slow time. Consequently, an unambiguous velocity measurement range is narrowed, and when a velocity of a target object is calculated, a velocity aliasing case, namely, velocity ambiguity, is more likely to occur, and an obtained velocity of the target object is not a real velocity.

In a current velocity ambiguity resolution scheme, angle-domain fast fourier transform (FFT) is used. To be specific, FFT is performed on an echo signal received by radar, namely, a signal obtained after an electrical signal sent by a transmit antenna of the radar is reflected by the target object, all velocity ambiguity multiples are traversed, and FFT coherent accumulation is performed in an angle domain, to determine a correct velocity ambiguity multiple, and further determine a real velocity of the target object based on the correct velocity ambiguity multiple. When the radar includes a relatively large quantity of transmit antennas, the velocity ambiguity causes a relatively small phase jump between two adjacent transmit antennas, an FFT result is easily affected by a phase noise, and it is difficult to determine a velocity ambiguity multiple. In other words, velocity ambiguity resolution performance is relatively low.

SUMMARY

This application provides a signal sending method, a signal processing method, and a radar apparatus, to improve velocity ambiguity resolution performance, and more accurately determine an actual velocity of a target.

According to a first aspect, an embodiment of this application provides a signal sending method. The method may be applied to a radar apparatus, the radar apparatus includes at least three transmit antennas, and the method includes:
  determining at least two transmit antenna groups of the radar apparatus, where each transmit antenna group includes at least one transmit antenna; and
  sending signals by using the at least two transmit antenna groups, where the at least two transmit antenna groups send signals in a TDM manner, and a plurality of transmit antennas included in each transmit antenna group including a plurality of transmit antennas in the at least two transmit antenna groups send signals in a CDM manner.

In this embodiment of this application, the method may be performed by a detection apparatus. For example, the detection apparatus is a radar apparatus, the radar apparatus may be radar, or may be a communications apparatus communicatively connected to the radar. In this solution, to send a signal, the radar apparatus may first group included transmit antennas. For example, N included transmit antennas are divided into at least two transmit antenna groups, for example, K transmit antenna groups. The K transmit antenna groups send signals in the TDM manner, and transmit antennas included in each transmit antenna group simultaneously send signals. For example, the transmit antennas included in each transmit antenna group send signals in the CDM manner. A quantity of transmit antenna groups of the radar apparatus that send signals in the TDM manner is reduced, so that a phase jump between virtual antenna array elements of the radar apparatus can be enlarged. According to the signal sending method in this embodiment of this application, when the radar apparatus resolves velocity ambiguity, FFT needs to be performed for only K times. In comparison with a case in which FFT is performed for N times in a conventional technology, a calculation amount is reduced. In addition, the transmit antennas included in each transmit antenna group simultaneously send signals, and a signal-to-noise ratio of signals that may be accumulated in a unit time is relatively high. This is more conducive to detecting a target based on an FFT result corresponding to each transmit antenna group.

In a possible design, the determining at least two transmit antenna groups of the radar apparatus includes:
  randomly determining the at least two transmit antenna groups based on the at least three transmit antennas.

In a manner of determining the at least two transmit antenna groups, each time before the radar apparatus sends a signal, the transmit antennas included by the radar apparatus may be randomly divided into at least two transmit antenna groups, so that adjacent virtual antenna array elements in an antenna arrangement sequence have a random phase jump pattern, to reduce a possibility of a phenomenon that a velocity and an angle are coupled, and improve performance of decoupling between the velocity and the angle.

In a possible design, numbers of the transmit antennas included by the radar apparatus range from 1 to N, N is greater than or equal to 3, and at least two transmit antennas in each transmit antenna group have inconsecutive numbers; or any two transmit antennas in each transmit antenna group have inconsecutive numbers.

In another possible design, in each transmit antenna group, an interval between numbers of at least two transmit antennas with adjacent numbers is greater than 1, or an interval between numbers of any two transmit antennas with adjacent numbers is greater than 1.

In an actual application, a number of a transmit antenna included in each transmit antenna group obtained through division by the radar apparatus is randomly selected. For example, at least two transmit antennas have inconsecutive numbers, any two transmit antennas have inconsecutive numbers, the interval between the numbers of the at least two transmit antennas with adjacent numbers is greater than 1, or the interval between the numbers of the any two transmit antennas with adjacent numbers is greater than 1. In this case, each time before the radar apparatus sends a signal, it may be ensured that an interval between numbers of transmit antennas included in each transmit antenna group is as large as possible, so that the adjacent virtual antenna array elements have a more random phase jump pattern, to reduce the possibility that the velocity and the angle are coupled, and improve the performance of decoupling between the velocity and the angle.

In a possible design, the determining at least two transmit antenna groups of the radar apparatus includes:
  determining a first grouping manner in a plurality of grouping manners, where the at least two transmit antenna groups indicated by the first grouping manner correspond to an optimal performance parameter, and the performance parameter is used to indicate velocity ambiguity resolution performance.

In a possible design, the plurality of grouping manners include all possible grouping manners of the at least three transmit antennas.

In another manner of determining the at least two transmit antenna groups, in actual use of the radar apparatus, velocity ambiguity resolution performance corresponding to the plurality of grouping manners may be compared. In a grouping manner, it may be considered that the radar apparatus performs one random division, to obtain the at least two transmit antenna groups. Therefore, the radar apparatus determines the at least two transmit antenna groups based on a grouping manner corresponding to optimal velocity ambiguity resolution performance, namely, the first grouping manner. In this case, the radar apparatus may subsequently send signals by using the at least two transmit antenna groups, without a need to re-determine the at least two transmit antenna groups each time, so that not only relatively good subsequent velocity ambiguity resolution performance can be ensured, but also a load of the radar apparatus can be reduced.

In a possible design, quantities of transmit antennas included in the at least two transmit antenna groups are different or the same.

In this embodiment of this application, the quantities of transmit antennas included in the at least two transmit antenna groups may be the same or may be different. This may be applied to both a case in which a quantity of transmit antennas is a prime number and a case in which a quantity of transmit antennas is not a prime number. An application scope is wider.

According to a second aspect, a signal processing method is provided. The method is applied to a radar apparatus, the radar apparatus includes at least three transmit antennas and at least one receive antenna, and the method includes:
  determining at least two groups of detection information based on a signal received by the at least one receive antenna, where the at least two groups of detection information correspond to at least two transmit antenna groups including the at least three transmit antennas, each transmit antenna group includes at least one transmit antenna, the at least two transmit antenna groups send signals in a TDM manner, and a plurality of transmit antennas included in each transmit antenna group including a plurality of transmit antennas in the at least two transmit antenna groups send signals in a CDM manner;
  determining at least three pieces of detection information based on the at least two groups of detection information, where the at least three pieces of detection information are used to determine a velocity estimation value of a target, and the at least three pieces of detection information correspond to the at least three transmit antennas; and
  determining a real velocity of the target based on a first velocity ambiguity multiple and the velocity estimation value of the target, where the first velocity ambiguity multiple is one of at least two velocity ambiguity multiples corresponding to the at least two groups of detection information.

In this embodiment of this application, when the radar apparatus resolves velocity ambiguity, signals received by the radar apparatus may be divided into at least two groups of signals based on the at least two transmit antenna groups obtained through division for sending signals by the radar apparatus, to determine a group of detection information based on each group of signals. In comparison with a conventional technology in which detection information is determined after the received signals are divided into signals corresponding to each transmit antenna, a quantity of groups of detection information is reduced, thereby reducing a calculation amount.

In a possible design, the determining at least two groups of detection information based on a signal received by the at least one receive antenna includes:
  separately converting the at least two groups of signals into a range-Doppler domain, to obtain the at least two groups of detection information, where
  the at least two groups of signals are signals corresponding to the at least two transmit antenna groups in the received signals.

In a possible design, determining a velocity ambiguity multiple includes:
  determining a plurality of phases of a plurality of virtual antenna array elements included by the radar apparatus, where the virtual antenna array element corresponds to one transmit antenna and one receive antenna, and one virtual antenna array element corresponds to one phase;
  separately performing Doppler phase compensation for the plurality of phases; and
  superimposing the at least two pieces of detection information in an angle domain, and determining the velocity ambiguity multiple based on a superimposition result.

In a possible design, the determining the velocity ambiguity multiple based on a superimposition result includes:
  determining a velocity ambiguity multiple corresponding to a maximum peak value in the superposition result as the velocity ambiguity multiple.

For technical effects brought by the second aspect or the possible implementations of the second aspect, refer to the description of the technical effects of the first aspect or the possible implementations of the first aspect.

According to a third aspect, a method is provided. The method may be performed by a chip disposed in a detection device, and the method includes:
  determining at least two transmit antenna groups of a radar apparatus, where each transmit antenna group includes at least one transmit antenna; and
  controlling the at least two transmit antenna groups to send signals in a time division multiplexing TDM manner, and controlling a plurality of transmit antennas included in each transmit antenna group including a plurality of transmit antennas in the at least two transmit antenna groups to send signals in a code division multiplexing CDM manner.

In a possible design, the determining at least two transmit antenna groups of the radar apparatus includes:
  randomly determining the at least two transmit antenna groups based on the at least three transmit antennas.

In a possible design, numbers of transmit antennas included by the radar apparatus range from 1 to N, N is greater than or equal to 3, and at least two transmit antennas in each transmit antenna group have inconsecutive numbers; or any two transmit antennas in each transmit antenna group have inconsecutive numbers.

In another possible design, in each transmit antenna group, an interval between numbers of at least two transmit antennas with adjacent numbers is greater than 1, or an interval between numbers of any two transmit antennas with adjacent numbers is greater than 1.

In a possible design, the determining at least two transmit antenna groups of the radar apparatus includes:
  determining a first grouping manner in a plurality of grouping manners, where the at least two transmit antenna groups indicated by the first grouping manner correspond to an optimal performance parameter, and the performance parameter is used to indicate velocity ambiguity resolution performance.

In a possible design, the plurality of grouping manners include all possible grouping manners of the at least three transmit antennas.

In a possible design, quantities of transmit antennas included in the at least two transmit antenna groups are different or the same.

According to a fourth aspect, an apparatus is provided, and the apparatus includes:
  at least one processor, configured to determine at least two transmit antenna groups of the apparatus, where each transmit antenna group includes at least one transmit antenna; and
  the at least two transmit antenna groups, configured to send signals, where the at least two transmit antenna groups send signals in a time division multiplexing TDM manner, and a plurality of transmit antennas included in each transmit antenna group including a plurality of transmit antennas in the at least two transmit antenna groups send signals in a code division multiplexing CDM manner.

In a possible design, the at least one processor is specifically configured to:
  randomly determine the at least two transmit antenna groups based on the at least three transmit antennas.

In a possible design, numbers of transmit antennas included by the apparatus range from 1 to N, N is greater than or equal to 3, and at least two transmit antennas in each transmit antenna group have inconsecutive numbers; or any two transmit antennas in each transmit antenna group have inconsecutive numbers.

In a possible design, in each transmit antenna group, an interval between numbers of at least two transmit antennas with adjacent numbers is greater than 1, or an interval between numbers of any two transmit antennas with adjacent numbers is greater than 1.

In a possible design, the at least one processor is specifically configured to:
  determine a first grouping manner in a plurality of grouping manners, where the at least two transmit antenna groups indicated by the first grouping manner correspond to an optimal performance parameter, and the performance parameter is used to indicate velocity ambiguity resolution performance.

In a possible design, the plurality of grouping manners include all possible grouping manners of the at least three transmit antennas.

In a possible design, quantities of transmit antennas included in the at least two transmit antenna groups are different or the same.

According to a fifth aspect, an apparatus is provided. For example, the apparatus is the foregoing radar apparatus. The apparatus includes at least one processing unit and a communications interface, and the at least one processing unit and the communications interface are coupled to each other, to implement the method described in the first aspect or various possible designs of the first aspect. For example, the apparatus is radar. For example, the communications interface may be implemented by using an antenna, a feeder, a codec, or the like in the apparatus. Alternatively, if the apparatus is a chip disposed in a detection device, the communications interface is, for example, a communications interface in the chip. The communications interface is connected to a radio frequency transceiver component in the detection device, to receive and send information by using the radio frequency transceiver component.

The at least one processing unit is configured to determine at least two transmit antenna groups of the radar apparatus, where each transmit antenna group includes at least one transmit antenna.

The communications interface is configured to control the at least two transmit antenna groups to send signals in a time division multiplexing TDM manner. A plurality of transmit antennas included in each transmit antenna group including a plurality of transmit antennas in the at least two transmit antenna groups send signals in a code division multiplexing CDM manner.

In a possible design, the at least one processing unit is specifically configured to:
  randomly determine the at least two transmit antenna groups based on the at least three transmit antennas.

In a possible design, numbers of transmit antennas included by the apparatus range from 1 to N, N is greater than or equal to 3, and at least two transmit antennas in each transmit antenna group have inconsecutive numbers; or any two transmit antennas in each transmit antenna group have inconsecutive numbers.

In a possible design, in each transmit antenna group, an interval between numbers of at least two transmit antennas with adjacent numbers is greater than 1, or an interval between numbers of any two transmit antennas with adjacent numbers is greater than 1.

In a possible design, the at least one processing unit is specifically configured to: determine a first grouping manner in a plurality of grouping manners, where the at least two transmit antenna groups indicated by the first grouping manner correspond to an optimal performance parameter, and the performance parameter is used to indicate velocity ambiguity resolution performance.

In a possible design, the plurality of grouping manners include all possible grouping manners of the at least three transmit antennas.

In a possible design, quantities of transmit antennas included in the at least two transmit antenna groups are different or the same.

According to a sixth aspect, an apparatus is provided, and the apparatus is a chip disposed in a detection device. The apparatus includes at least one processor and a communications interface, the communications interface is configured to provide program instructions for the at least one processor, and when the at least one processor executes the program instructions, the following steps are implemented:

determining at least two transmit antenna groups of a radar apparatus, where each transmit antenna group includes at least one transmit antenna; and controlling the at least two transmit antenna groups to send signals in a time division multiplexing TDM manner, and controlling a plurality of transmit antennas included in each transmit antenna group including a plurality of transmit antennas in the at least two transmit antenna groups to send signals in a code division multiplexing CDM manner.

In a possible design, the at least one processor is specifically configured to:

randomly determine the at least two transmit antenna groups based on the at least three transmit antennas.

In a possible design, numbers of transmit antennas included by the radar apparatus range from 1 to N, N is greater than or equal to 3, and at least two transmit antennas in each transmit antenna group have inconsecutive numbers; or any two transmit antennas in each transmit antenna group have inconsecutive numbers.

In another possible design, in each transmit antenna group, an interval between numbers of at least two transmit antennas with adjacent numbers is greater than 1, or an interval between numbers of any two transmit antennas with adjacent numbers is greater than 1.

In a possible design, the at least one processor is specifically configured to: determine a first grouping manner in a plurality of grouping manners, where the at least two transmit antenna groups indicated by the first grouping manner correspond to an optimal performance parameter, and the performance parameter is used to indicate velocity ambiguity resolution performance.

In a possible design, the plurality of grouping manners include all possible grouping manners of the at least three transmit antennas.

In a possible design, quantities of transmit antennas included in the at least two transmit antenna groups are different or the same.

According to a seventh aspect, an apparatus is provided, and the apparatus includes:

a communications interface, configured to receive at least one signal; and at least one processing unit, configured to: determine at least two groups of detection information based on the signal received by the communications interface, where the at least two groups of detection information correspond to at least two transmit antenna groups including at least three transmit antennas included by the apparatus, each transmit antenna group includes at least one transmit antenna, the at least two transmit antenna groups send signals in a TDM manner, and a plurality of transmit antennas included in each transmit antenna group including a plurality of transmit antennas in the at least two transmit antenna groups send signals in a CDM manner;

determine at least three pieces of detection information based on the at least two groups of detection information, where the at least three pieces of detection information are used to determine a velocity estimation value of a target, and the at least three pieces of detection information correspond to the at least three transmit antennas; and determine a real velocity of the target based on a first velocity ambiguity multiple and the velocity estimation value of the target, where the first velocity ambiguity multiple is one of at least two velocity ambiguity multiples corresponding to the at least two groups of detection information.

In a possible design, the at least one processing unit is specifically configured to:

separately convert the at least two groups of signals into a range-Doppler domain, to obtain the at least two groups of detection information, where the at least two groups of signals are signals corresponding to the at least two transmit antenna groups in the received signal.

In a possible design, the at least one processing unit is specifically configured to:

determine a plurality of phases of a plurality of virtual antenna array elements included by the radar apparatus, where the virtual antenna array element corresponds to one transmit antenna and one receive antenna, and one virtual antenna array element corresponds to one phase;

separately perform Doppler phase compensation for the plurality of phases; and superimpose the at least two pieces of detection information in an angle domain, and determine the velocity ambiguity multiple based on a superimposition result.

In a possible design, the at least one processing unit is specifically configured to:

determine a velocity ambiguity multiple corresponding to a maximum peak value in the superposition result as the velocity ambiguity multiple.

According to an eighth aspect, an apparatus is provided. For example, the apparatus is the foregoing radar apparatus. The apparatus includes at least one receive antenna and at least one processor, and the at least one receive antenna and the at least one processor are coupled to each other, to implement the method described in the second aspect or various possible designs of the second aspect. For example, the radar device is radar. For example, a transceiver may be implemented by using an antenna, a feeder, a codec, or the like in a communications device. Alternatively, if the radar apparatus is a chip disposed in a detection device, the transceiver is, for example, a communications interface in the chip. The communications interface is connected to a radio frequency transceiver component in the detection device, to receive and send information by using the radio frequency transceiver component.

The at least one receive antenna is configured to receive at least one signal.

The at least one processor is configured to: determine at least two groups of detection information based on the signal received by the at least one receive antenna, where the at least two groups of detection information correspond to at least two transmit antenna groups including the at least three transmit antennas, each transmit antenna group includes at least one transmit antenna, the at least two transmit antenna groups send signals in a TDM manner, and a plurality of transmit antennas included in each transmit antenna group including a plurality of transmit antennas in the at least two transmit antenna groups send signals in a CDM manner;

determine at least three pieces of detection information based on the at least two groups of detection information, where the at least three pieces of detection information are used to determine a velocity estimation value of a target, and the at least three pieces of detection information correspond to the at least three transmit antennas; and determine a real velocity of the target based on a first velocity ambiguity multiple and the velocity estimation value of the target, where the first velocity ambiguity multiple is one of at least two velocity ambiguity multiples corresponding to the at least two groups of detection information.

In a possible design, the at least one processor is specifically configured to:

separately convert the at least two groups of signals into a range-Doppler domain, to obtain the at least two groups of detection information, where the at least two groups of signals are signals corresponding to the at least two transmit antenna groups in the received signal.

In a possible design, the at least one processor is specifically configured to:

determine a plurality of phases of a plurality of virtual antenna array elements included by the radar apparatus, where the virtual antenna array element corresponds to one transmit antenna and one receive antenna, and one virtual antenna array element corresponds to one phase;

separately perform Doppler phase compensation for the plurality of phases; and superimpose the at least two pieces of detection information in an angle domain, and determine the velocity ambiguity multiple based on a superimposition result.

In a possible design, the at least one processor is specifically configured to:

determine a velocity ambiguity multiple corresponding to a maximum peak value in the superposition result as the velocity ambiguity multiple.

According to a ninth aspect, another apparatus is provided. The apparatus may be a radar apparatus in the foregoing method design. For example, the apparatus is a chip disposed in a detection device. For example, the detection device is radar. The apparatus includes: a memory, configured to store computer-executable program code; and a processor, where the processor is coupled to the memory. The program code stored in the memory includes instructions, and when the processor executes the instructions, the apparatus or a device on which the apparatus is installed is enabled to perform the method according to any one of the first aspect or the possible implementations of the first aspect; or the apparatus or a device on which the apparatus is installed is enabled to perform the method according to any one of the second aspect or the possible implementations of the second aspect.

The apparatus may further include a communications interface, and the communications interface may be a transceiver in the detection device, for example, is implemented by using an antenna, a feeder, a codec, or the like in the radar apparatus. Alternatively, if the apparatus is a chip disposed in the detection device, the communications interface may be an input/output interface of the chip, for example, an input/output pin.

According to a tenth aspect, a communications system is provided. The communications system may include, for example, one or more of the apparatuses according to the fourth aspect, the fifth aspect, the sixth aspect, the seventh aspect, or the eighth aspect; or the communications system may further include another communications apparatus, for example, a central node, or may further include a target object.

According to an eleventh aspect, a computer storage medium is provided. The computer-readable storage medium stores instructions, and when the instructions are run on a computer, the computer is enabled to perform the method according to any one of the first aspect or the possible designs of the first aspect; or the computer is enabled to perform the method according to any one of the second aspect or the possible designs of the second aspect.

According to a twelfth aspect, a computer program product including instructions is provided. The computer program product stores the instructions, and when the instructions are run on a computer, the computer is enabled to perform the method according to any one of the first aspect or the possible designs of the first aspect; or the computer is enabled to perform the method according to any one of the second aspect or the possible designs of the second aspect.

For beneficial effects of the third aspect to the twelfth aspect and the implementations of thereof, refer to descriptions of beneficial effects of the method and the implementations of the first aspect or the method and the implementations of the second aspect.

DESCRIPTION OF EMBODIMENTS

Figure 1:
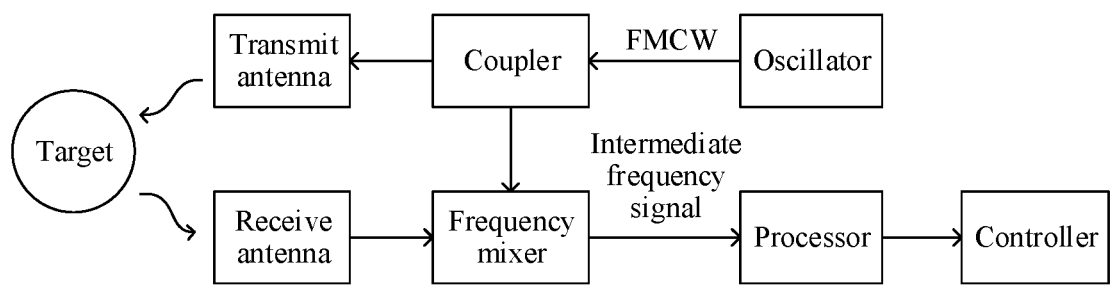
FIG. 1 is a diagram of an operating principle of a millimeter-wave radar.

To make the objectives, technical solutions and advantages of embodiments of this application clearer, the following further describes the embodiments of this application in detail with reference to the accompanying drawings.

Before this application is described, some terms of the embodiments of this application are first briefly explained and described, to help a person skilled in the art have a better understanding.

(1) A radar detection apparatus, for example, is radar, or may be another apparatus configured to perform detection (for example, ranging).

(2) Radar, or referred to as a radar apparatus, may also be referred to as a detector, a radar detection apparatus, a radar signal sending apparatus, or the like. A working principle of the radar is to send a signal (or referred to as a detection signal) and receive a reflected signal reflected by a target object, to detect the corresponding target object. The signal transmitted by the radar may be a radar signal, and correspondingly, the received reflected signal reflected by the target object may also be a radar signal.

(3) A transmission period of a radar detection apparatus (or referred to as a frequency sweep period, a frequency sweep time, frequency sweep duration, or the like of the radar detection apparatus) is a period in which the radar detection apparatus sends a radar signal having a complete waveform. The radar detection apparatus usually sends a radar signal in a plurality of frequency sweep periods within consecutive periods of time.

(4) A frequency modulated continuous wave (FMCW) is an electromagnetic wave whose frequency varies with time. In the following descriptions, FMCW radar is used as an example. It should be noted that this application may also be applied to radar having another mechanism. A type of radar is not limited in this application.

(5) A linear frequency modulated continuous wave is an electromagnetic wave whose frequency varies linearly with time. That the frequency varies linearly with time usually means that the frequency varies linearly with time in one transmission period. Specifically, a waveform of the linear frequency modulated continuous wave is usually a sawtooth wave or a triangular wave, or may be another waveform, for example, a stepped-frequency waveform.

(6) A maximum velocity measurement range of a radar detection apparatus, or referred to as a maximum detection velocity of the radar detection apparatus, is a parameter related to a configuration of the radar detection apparatus (for example, related to a factory set parameter of the radar detection apparatus). For example, the radar detection apparatus is radar, a time interval at which two adjacent transmit antennas of the radar send signals is T, and a maximum detection velocity of the radar is $\pm\lambda/4T$.

(7) Intermediate frequency (IF) signal: For example, a radar detection apparatus is radar. A signal obtained after a local-frequency signal of the radar and a reflected signal received by the radar (a signal obtained after a transmit signal of the radar is reflected by a target object) are processed by a frequency mixer is an intermediate frequency signal. Specifically, some frequency modulated continuous wave signals generated by an oscillator are used as local-frequency signals, and the others are used as transmit signals and are transmitted by using a transmit antenna. A reflected signal of a transmit signal received by a receive antenna is mixed with the local-frequency signal, to obtain the "intermediate frequency signal". One or more of range information, velocity information, or angle information of the target object may be obtained based on the intermediate frequency signal. The range information may be information about a range of the target object relative to current radar, the velocity information may be a projection of a velocity of the target object relative to the current radar in a direction in which the target object is connected to the radar, and the angle information may be information about an angle of the target object relative to the current radar. Further, a frequency of the intermediate frequency signal is referred to as an intermediate frequency.

(8) Velocity ambiguity is a phenomenon that when pulse-Doppler radar operates at a medium repetition frequency and a low repetition frequency, velocities of a detected target object are mixed due to a spectrum overlapping phenomenon, and it is difficult to distinguish a real velocity of a target. The radar sends a signal by using a transmit antenna. If the signal encounters the target object, the signal is reflected by the target object, to form an echo signal. The radar receives the echo signal by using a receive antenna. The radar may determine a radial velocity of the target object relative to the radar based on a frequency shift of the echo signal relative to the signal transmitted by the transmit antenna of the radar. To be specific, $vt=\lambda*fd/2$. Herein, k is a transmitter wavelength, vt is a velocity of the target object, and fd is the frequency shift of the echo signal relative to the signal transmitted by the signal transmitted by the transmit antenna of the radar. When fd>fr/2, vt is mixed with a target velocity $\lambda\times(fd-nfr)/2$ (n is a positive integer). Herein, fr is a repetition frequency at which the radar sends a signal. If a user cannot distinguish an overlap between a real Doppler shift of the target object and a frequency interval of the repetition frequency at which the transmit antenna of the radar transmits a signal, the velocity ambiguity is generated.

(9) An unambiguous velocity is a radial velocity value that is of a target object and that corresponds to a phase shift that is between a pulse and a next pulse and that can be measured by Doppler radar.

(10) A maximum unambiguous velocity may be a maximum detection velocity of radar, and is a radial velocity value that is of a target object and that corresponds to a maximum pulse phase shift of 360° that is between a pulse and a next pulse and that can be measured by Doppler radar. From this perspective, the foregoing velocity ambiguity may also be considered as follows: If the target object moves too far within a time interval between two pulses, a real phase shift of the target object exceeds 360°. However, a phase shift value less than 360° is actually configured. A velocity value corresponding to the phase shift is also smaller than the maximum unambiguous velocity, and a measured velocity value is not a real velocity value. In other words, the velocity ambiguity occurs.

(11) "At least one" means one or more, and "a plurality of" means two or more. The term "and/or" describes an association relationship between associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one item (piece) of the following" or a similar expression thereof refers to any combination of these items, including any combination of a single item (piece) or a plurality of items (pieces). For example, at least one item (piece) of a, b, or c may represent a, b, c, a-b, a-c, b-c, or a-b-c. Herein, a, b, and c may be singular or plural.

In addition, unless otherwise specified, ordinal numbers such as "first" and "second" mentioned in the embodiments of this application are used to distinguish between a plurality of objects, but are not used to limit a sequence, a time sequence, a priority, or an importance degree of the plurality of objects.

The foregoing describes some concepts involved in the embodiments of this application, and the following describes technical features of the embodiments of this application.

A millimeter wave is an electromagnetic wave whose wavelength ranges from 1 mm to 10 mm, and corresponds to a frequency range from 30 GHz to 300 GHz. In this frequency band, features related to the millimeter wave enable the millimeter wave to be very suitable for the vehicle-mounted field. High bandwidth means that there are abundant frequency domain resources and a low antenna side lobe, thereby facilitating imaging or quasi-imaging. A small wavelength means that a size of a radar device and an antenna diameter are reduced, and therefore a weight is reduced. A narrow beam means that in a case of a same antenna size, a millimeter-wave beam is much narrower than a micrometer-wave beam, and therefore there is high radar resolution. Strong penetration means that compared with laser radar and an optical system, millimeter-wave radar has a better capability of penetrating smoke, dust, and fog, and can work around the clock.

A vehicle-mounted millimeter-wave radar system usually includes apparatuses such as an oscillator, a transmit antenna, a receive antenna, a frequency mixer, a coupler, a processor, and a controller. FIG. 1 is a diagram of an operating principle of millimeter-wave radar. The oscillator generates a radar signal whose frequency increases linearly over time, and the radar signal usually has a frequency modulated continuous wave. Some radar signals are output to the frequency mixer through a directional coupler and are used as local-frequency signals, and the others are transmitted by using the transmit antenna. The receive antenna receives a radar signal reflected after a transmitted radar signal encounters an object in front of a vehicle, and the frequency mixer mixes the received radar signal and the local-frequency signal, to obtain an intermediate frequency signal. The intermediate frequency signal includes information such as a range, a velocity, and an angle of a target object relative to the radar system. The intermediate frequency signal passes through a low-pass filter and then is transmitted to the processor after amplification processing. That the processor processes a received signal usually means that the processor performs fast fourier transform, spectrum analysis, and the like on the received signal, to obtain signals such as the range and the velocity of the target object relative to the radar system, and further obtain information such as the angle of the target object relative to the radar system. Finally, the processor may output the obtained information to the controller, to control behavior of the vehicle.

Figure 2:
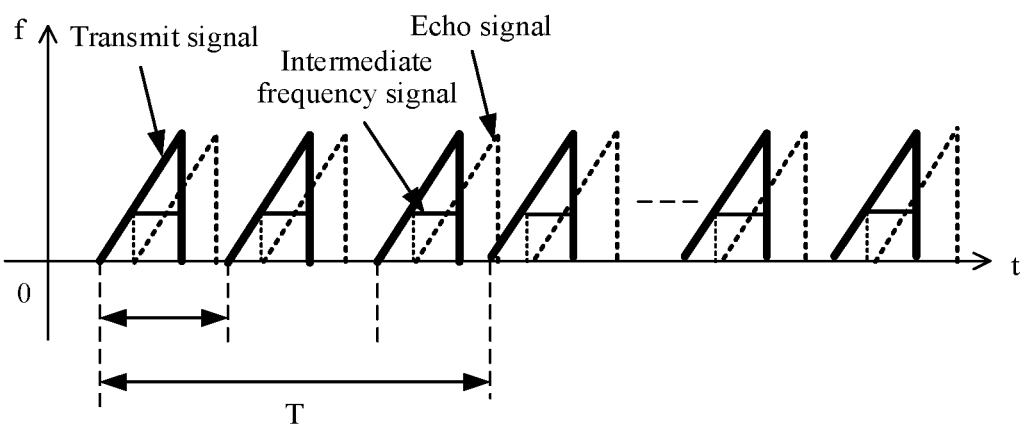
FIG. 2 is a schematic diagram of a transmit signal, an echo signal, and an intermediate frequency signal.

For example, FIG. 2 is a schematic diagram in which FMCW radar sends a signal. A radar signal generated by an oscillator has a frequency modulated continuous wave. To be specific, a radar system sends one group of linear frequency modulated signals with a same waveform and different start time points by using a transmit antenna. The linear frequency modulated signal may alternatively be referred to as a chirp signal. An interval (denoted by T in FIG. 2) at which the chirp signal is transmitted is referred to as a pulse repetition time (PRT). The radar sends one chirp signal within one PRT. Duration of the chirp signal is less than or equal to one PRT. Usually, the duration of the chirp signal is less than one PRT. As shown in FIG. 2, a transmit antenna of the radar sends a signal, and an echo signal received by a receive antenna of the radar is a signal obtained after a radar signal transmitted by the transmit antenna encounters an object. A frequency mixer mixes the received echo signal and a local-frequency signal, to obtain an intermediate frequency signal. Information such as a range and a velocity of a target object relative to the radar system may be determined based on the intermediate frequency signal.

For example, that the range and the velocity of the target object relative to the radar system are determined based on the intermediate frequency signal may be as follows: The intermediate frequency signal is used for a radar signal processing part in each PRT. To be specific, a data sequence obtained after sampling and quantization forms a two-dimensional array. One dimension of the two-dimensional array corresponds to a sampling point sequence number in the PRT, and the other dimension corresponds to a PRT number. Fourier transform is performed on the two-dimensional array, to obtain a radar received signal with a range-Doppler domain representation. A case in which the range-Doppler domain representation is used for an echo component of each target object corresponds to a two-dimensional sinc function. In other words, each target object corresponds to one local peak value in the range-Doppler domain representation. The radar received signal with the range-Doppler domain representation is actually a complex two-dimensional array. A point-to-point modulo operation is performed on the complex two-dimensional array, and an obtained modulus value corresponds to a local peak value. The local peak value corresponds to sequence numbers in the two dimensions. A frequency of a single-frequency sine wave corresponding to the target object and a phase difference between intermediate frequency signals in different PRTs may be obtained, and information such as the range and the velocity of the target object may be further obtained.

Figure 3:
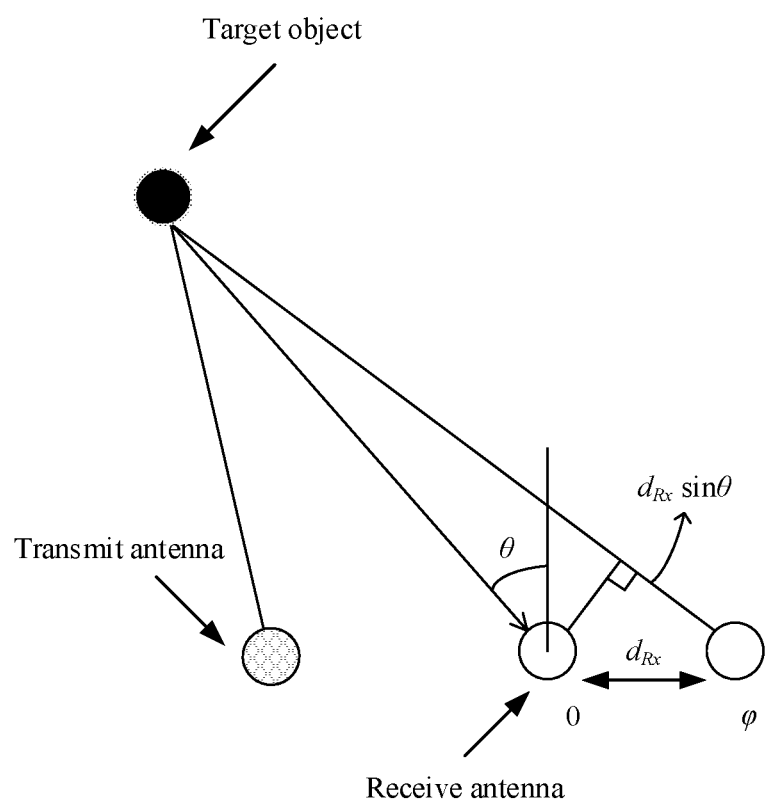
FIG. 3 is a schematic diagram of an angle measurement principle of SIMO radar.

An angle measurement principle of radar is described below by using an example in which radar includes one transmit antenna and two receive antennas. FIG. 3 is a schematic diagram of an angle measurement principle of radar. In FIG. 3, a signal transmitted by the transmit antenna is reflected by a target object, and then is received by the two receive antennas. A phase difference between the two receive antennas is $\varphi$, and a range difference between the target object and each of the two receive antennas is calculated based on the phase difference and a wavelength, namely, $d_{Rx} \sin \theta$ in FIG. 3. Herein, $d_{Rx}$ is a range between the two receive antennas, and $\theta$ is an angle between the target object and a normal line of a receive antenna. Therefore, a value of $\theta$, namely, an angle of the target object relative to the radar, may be calculated. Specifically, the angle of the target object relative to the radar may be calculated according to a formula (1).

$$\varphi = 2\pi(d_{Rx} \sin \theta)/\lambda \quad (1)$$

In FIG. 3, the example in which the radar includes one transmit antenna and two receive antennas is only used to describe the angle measurement principle of the radar. For MIMO radar including M transmit antennas and N receive antennas, refer to FIG. 3. An angle of the target object relative to the radar in M×N virtual antenna array elements is detected. Details are not described herein again.

Figure 4:
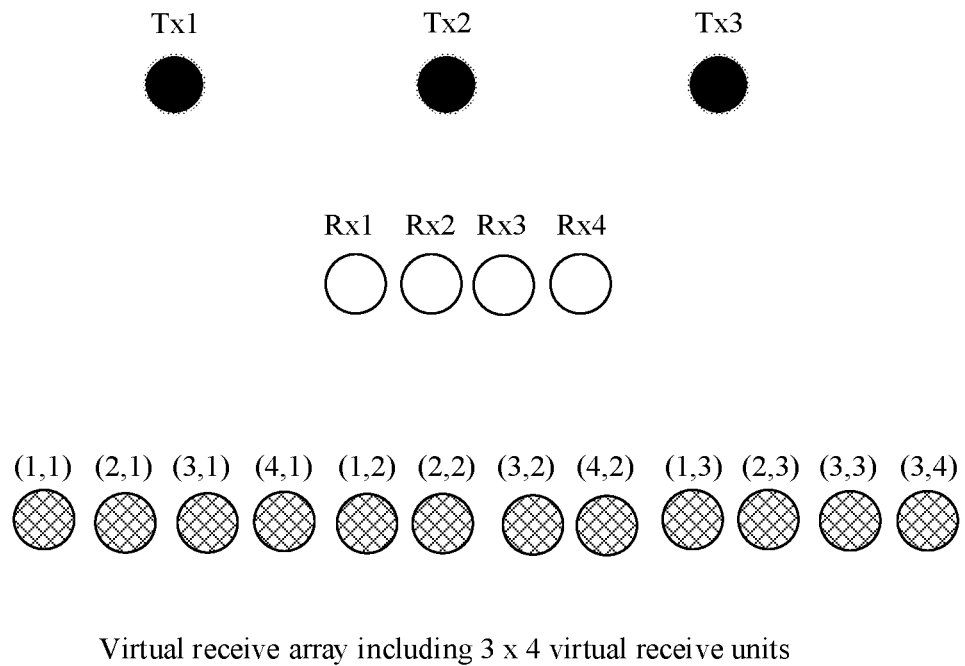
FIG. 4 is a schematic diagram of a principle of a virtual antenna array element of MIMO radar.

For the MIMO radar, namely, radar including a plurality of transmit antennas and a plurality of receive antennas, FIG. 4 is a schematic diagram of a principle of a virtual antenna array element of MIMO radar. In FIG. 4, that the MIMO radar includes three transmit antennas (Tx1, Tx2, and Tx3) and four receive antennas (Rx1, Rx2, Rx3, and Rx4) is used as an example. An array element including one transmit antenna and a plurality of receive antennas may be referred to as a virtual antenna array element. As shown in FIG. 4, it may be understood that the three transmit antennas and the four receive antennas form 12 virtual antenna array elements, for example, including a virtual antenna array element (M, N). Herein, M is a number of the receive antenna, and N is a number of the transmit antenna. A signal received by each receive antennas is a signal obtained through superposition after signals transmitted by all transmit antennas are transmitted by the target object. Each receive antenna may extract, from received signals based on a transmit parameter used by a plurality of transmit antennas to send signals, for example, a sending moment at which signals are sent, signals that are respectively from different transmit antennas and that are reflected by the target object, and the signals are used as received signals of the virtual antenna array elements.

It is assumed that a time interval at which two adjacent transmit antennas included by the radar send signals is Tr. Herein, the adjacent two transmit antennas mean that start moments at which the two transmit antennas send signals are adjacent in time domain. A maximum detection velocity of the radar is defined as $v_{max}$. Therefore, a maximum velocity measurement range of the radar is $[-v_{max}, +v_{max}]$. The maximum detection velocity of the radar may be calculated according to the following formula (2).

$$v_{max} = \lambda/4T_r \quad (2)$$

Figure 5:
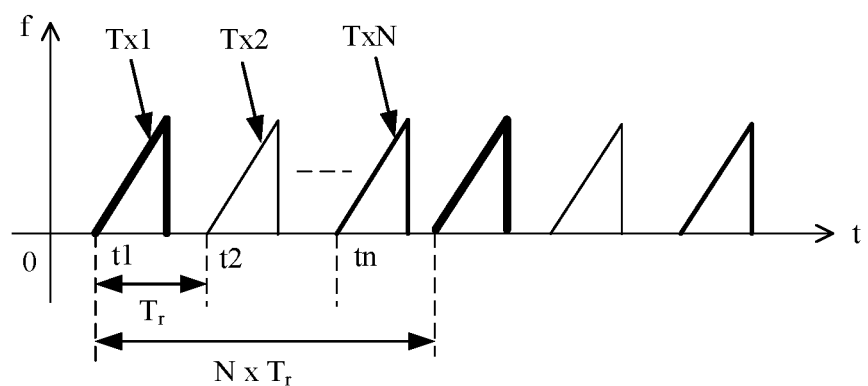
FIG. 5 is a schematic diagram in which MIMO radar sends signals in a TDM manner.

For example, in some embodiments, the MIMO radar may send signals in a TDM manner. To be specific, different transmit antennas send signals at different start moments, and time ranges in which the transmit antennas send signals do not overlap. In other words, in a time range in which each transmit antenna sends a signal, another transmit antenna does not send a signal. FIG. 5 is a schematic diagram in which MIMO radar sends signals in a TDM manner. In FIG. 5, a horizontal coordinate t represents time domain, and a vertical coordinate f represents frequency domain. In FIG. 5, that the MIMO radar includes N transmit antennas is used as an example. The N transmit antennas are respectively a transmit antenna Tx1, a transmit antenna Tx2, . . . , and a transmit antenna TxN. It can be seen from FIG. 5 that a start moment at which the transmit antenna Tx1 sends a signal is t1, a start moment at which the transmit antenna Tx2 sends a signal is t2, and a start moment at which a transmit antenna Tx3 sends a signal is tn. In other words, different transmit antennas send signals at different start moments.

In FIG. 5, it is assumed that a time interval at which two adjacent transmit antennas send signals in time domain is Tr.

For example, a time interval at which the transmit antenna Tx1 and the transmit antenna Tx2 send signals is Tr. If two adjacent transmit antennas send signals at a same time interval, a time interval at which the transmit antenna Tx1 and the transmit antenna TxN send signals is N*Tr. In this case, the maximum detection velocity of the radar may be calculated according to the following formula (3).

$$v_{max} = \lambda/4 \times N \times T_r \quad (3)$$

It can be seen from the formula (1) and the formula (2) that if the MIMO radar sends signals in the TDM manner, the maximum detection velocity of the radar is reduced by N times.

In addition, a Doppler phase difference $\phi_1$ of the $k^{th}$ transmit antenna relative to the $1^{st}$ transmit antenna is generated due to a movement of the target object:

$$\phi_1 = 2\pi f_d T_r (k-1) \quad (4)$$

In the formula (4), $f_d$ is a Doppler frequency shift that is of an echo signal received by the radar and that is relative to a signal transmitted by a transmit antenna of the radar, k=1, . . . , M, and k is a ranking at which the radar sends a signal. To be specific, the $k^{th}$ transmit antenna indicates that a ranking at which the transmit antenna sends a signal is k.

Therefore, a phase difference $\phi$ between two adjacent transmit antennas may be calculated and determined according to the formula (2) and the formula (4):

$$\phi = 2\pi(d_{Tx} \sin \theta/\lambda + f_d T_r) \quad (5)$$

It can be seen from the formula (5) that the phase difference between two adjacent transmit antennas includes both angle information and velocity information. In other words, a phenomenon that an angle and a velocity are coupled occurs.

If $\phi$ caused by the Doppler frequency shift is not compensated for correctly, there is a deviation from a determined actual angle of the target object relative to the radar. If the deviation is relatively large, vehicle-mounted radar cannot accurately locate a location of a vehicle. Consequently, a safety problem may be caused.

To obtain a relatively accurate velocity and angle, impact of the Doppler frequency shift on angle calculation needs to be eliminated. Therefore, a real Doppler frequency shift needs to be estimated. To be specific, $f_d = 2v/\lambda$. In some embodiments, the radar may perform two dimensional fast fourier transformation (2 dimension-fast fourier transformation, 2D-FFT) processing on an echo signal received by a plurality of included virtual antenna array elements, for example, 12 virtual antenna array elements in FIG. 4, to obtain the radar received signal with the range-Doppler domain representation. The radar received signal with the range-Doppler domain representation is actually a complex two-dimensional array, a point-to-point modulo operation is performed on the complex two-dimensional array, and an obtained modulus value corresponds to a local peak value. A frequency of a single-frequency sine wave corresponding to the target object, namely, the Doppler frequency shift, may be obtained based on the local peak value. In this specification, the Doppler frequency shift is denoted as $f_{damb}$.

An actually calculated value of $f_{damb}$ may not be areal value of $f_{damb}$. In other words, $f_{damb}$ is ambiguous. If $f_{damb}$ is used as $f_d$, a calculated velocity is also ambiguous. From this perspective, if an absolute value of a real velocity of the target object $|v| > v_{max}$, a Doppler phase $|2\pi f_d T_r \times M| > \pi$. Consequently, phase ambiguity is generated, and velocity ambiguity occurs. In other words, the calculated velocity is not the real velocity of the target object.

Therefore, velocity ambiguity may be resolved. To be specific, the ambiguous velocity is restored to a maximum unambiguous velocity corresponding to a single chrip signal. In other words, $v_{max}=\lambda/4T_r$. Specifically, a quantity of times of phase ambiguity may be defined as a velocity ambiguity multiple τ. The velocity ambiguity multiple may also be referred to as a velocity ambiguity coefficient ξ.

When a quantity of transmit antennas included by the radar is an odd number, there is the following formula (6):

$$\xi = -\frac{N-1}{2} : \frac{N-1}{2} \tag{6}$$

When the quantity of transmit antennas included by the radar is an even number, and $f_{damb}>0$, there is the following formula (7):

$$\xi = -\frac{N-1}{2} : \frac{N-1}{2} + 1 \tag{7}$$

When the quantity of transmit antennas included by the radar is an even number, and there is the following formula (8):

$$\xi = -\frac{N-1}{2} - 1 : \frac{N-1}{2} \tag{8}$$

For the real value of $f_d$, there may be a formula (9):

$$f_d = f_{damb} + \frac{\xi}{N} \times \frac{1}{T_r} \tag{9}$$

It can be seen from the formula (9) that the velocity ambiguity coefficient ξ has M possible values. It is assumed that M is 3. Therefore, the possible values of are [−1, 0, 1], and a velocity obtained after ambiguity resolution v∈[−3$v_{max}$, 3$v_{max}$]. When the radar is designed, the maximum unambiguous velocity corresponding to the single chrip signal usually needs to meet a requirement of a system. The velocity ambiguity resolution is a process of determining a correct one from the various possible values of ξ.

Currently, one velocity ambiguity resolution method, for example, is an angle-domain FFT accumulation method. A specific process is as follows: It is assumed that all virtual antenna array elements of the radar are numbered in a location sequence. As shown in FIG. 4, from left to right, 12 virtual antenna array elements are numbered sequentially from 1 to 12. A phase of the $n^{th}$ virtual antenna array element is as follows:

$$\phi_{n,k}(\xi) = 2\pi\left(\frac{d\sin\theta(n-1)}{\lambda} + f_{damb}T_r(k-1)\right) + 2\pi\frac{\xi(k-1)}{N} \tag{10}$$

In the formula (10), $f_{damb}$ is the Doppler frequency shift, N is a quantity of transmit antennas, and k is a number of a transmission ranking corresponding to a virtual antenna array element. ξ=0, . . . N−1 is an ambiguity coefficient, and represents N possible Doppler ambiguity phases, and $\phi_{n,k}(\xi)$ is a phase value. 2D-FFT is performed on an echo signal received by the $n^{th}$ virtual antenna array element, to obtain the radar received signal with the range-Doppler domain representation, a to-be-detected target may be determined based on a range-Doppler domain, a phase value corresponding to a peak value that is of the target and that is of the range-Doppler domain representation is $\phi_{n,k}(\xi)$, and $\phi_{n,k}(\xi)$ may be obtained through direct measurement.

Because $\phi_{n,k}(\xi)$ obtained through direct measurement may also be ambiguous due to impact of the velocity ambiguity, possible Doppler phase compensation needs to be performed at each target point. In the angle-domain FFT accumulation method, all possible values of ξ are traversed, and FFT is performed for N times in an angle domain, to find a value of ξ corresponding to a maximum peak value.

Figure 6:
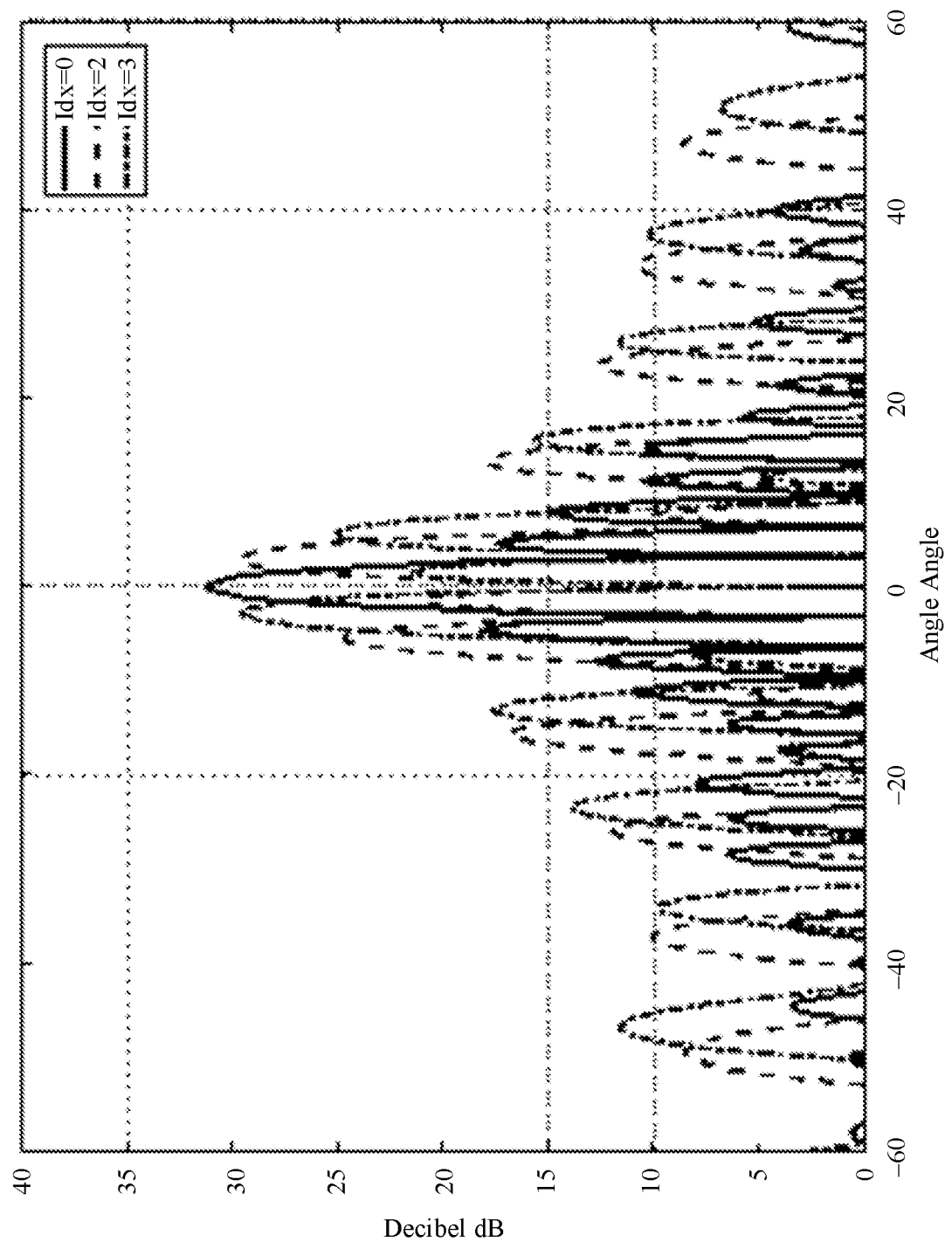
FIG. 6 is a direction diagram corresponding to a velocity ambiguity coefficient according to an embodiment of this application.
Figure 7:
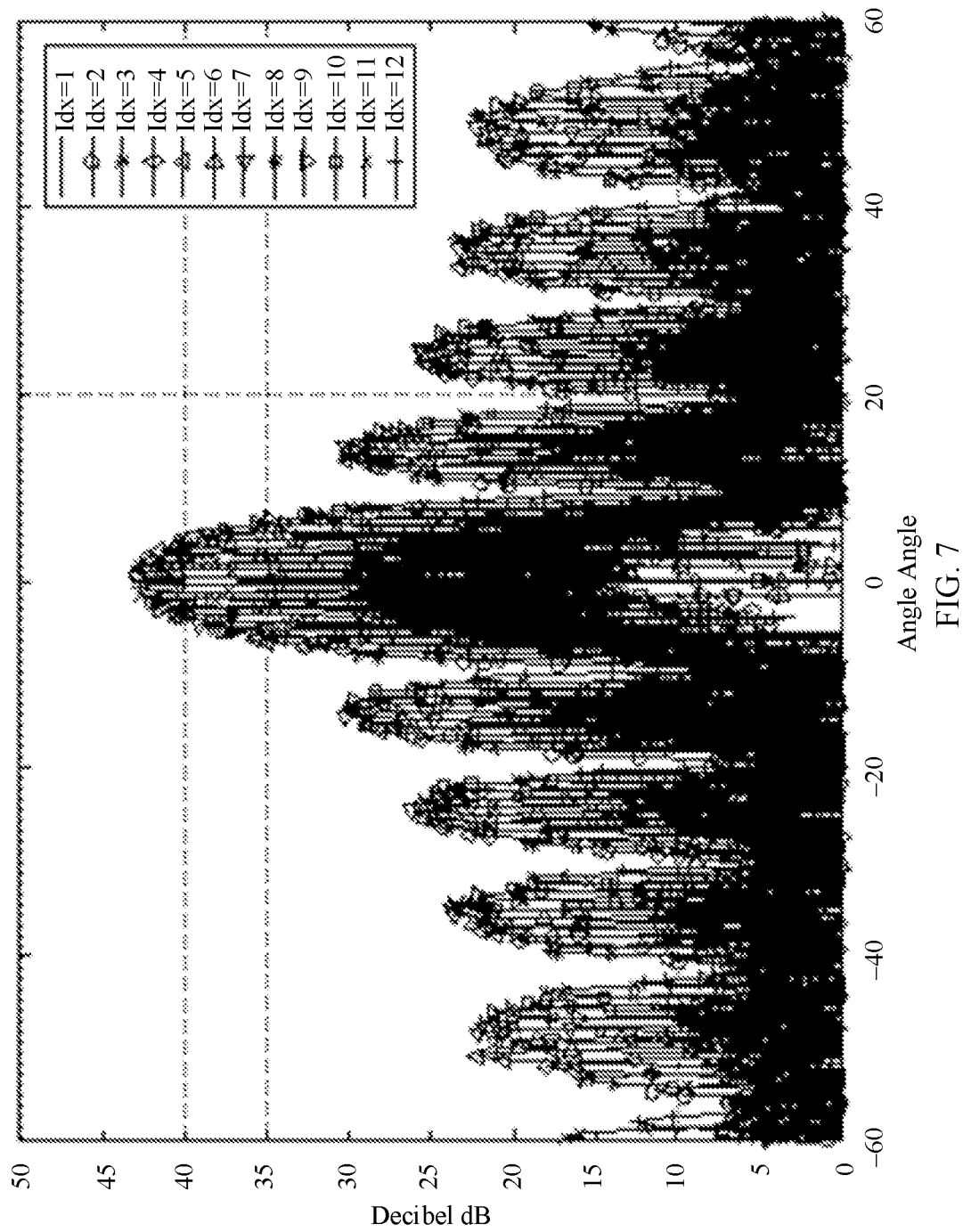
FIG. 7 is a direction diagram corresponding to another velocity ambiguity coefficient according to an embodiment of this application.

It can be seen that in the current angle-domain FFT accumulation method, for the N transmit antennas, N times of FFT processing and N peak searches need to be performed on each to-be-detected target. If a value of N is relatively large, a calculation amount is relatively large. In addition, a minimum phase jump is defined as 2π/N. The phase jump in the following is the minimum phase jump. If the value of N is relatively large, a phase jump caused by ambiguity, namely, 2π/N, is relatively small, a difference between peak values corresponding to different values of ξ is relatively small, a detection difficulty is increased, and velocity ambiguity resolution performance is relatively poor. For example, FIG. 6 is a direction diagram corresponding to an ambiguity coefficient when N=3. FIG. 7 is a direction diagram corresponding to an ambiguity coefficient when N=12. It can be seen from FIG. 6 and FIG. 7 that when N=12, a difference between peak values is relatively small. Therefore, a detection difficulty is greater, and velocity ambiguity resolution performance is relatively poor. In addition, the maximum unambiguous velocity is reduced by N times, and the radar sends signals in the TDM manner. Therefore, a signal-to-noise ratio of signals accumulated in a unit time is also reduced, and it is not easy to determine the target.

To solve the foregoing problems, embodiments of this application provide a signal sending method and a corresponding signal processing method. In the methods, a radar apparatus divides N transmit antennas into K transmit antenna groups, the K transmit antenna groups transmit signals in a TDM manner, and a transmit antenna included in each of the K transmit antenna groups send signals in a CDM manner. Therefore, FFT only needs to be performed for K times to resolve velocity ambiguity, so that a calculation amount is reduced. In addition, the transmit antenna included in each transmit antenna group sends signals in the CDM manner, and therefore, a signal-to-noise ratio of signals that may be accumulated in a unit time is relatively large when FFT is performed, to help detect a target.

Figure 8:
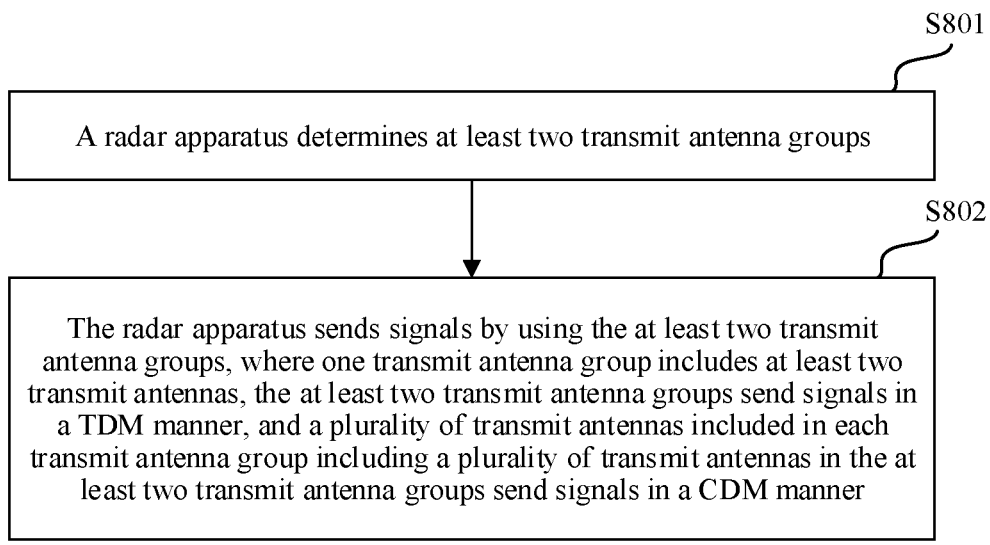
FIG. 8 is a schematic flowchart of a signal sending method according to an embodiment of this application.

In a possible solution, an embodiment of this application provides a signal sending method. FIG. 8 is a flowchart of the method. The method provided in the embodiment shown in FIG. 8 may be performed by a radar apparatus, and the radar apparatus may be a radar chip. For example, the radar apparatus is referred to as radar, or the radar apparatus may be a communications apparatus communicatively connected to the radar. In addition, in the following description, each signal sent by the radar apparatus may be a radar signal, and correspondingly, a received signal may also be a radar signal. The signal received by the radar may include an echo signal, and may further include a reflected wave from a ground, or the like. In this specification, that the signal received by the radar is an echo signal is used as an example.

S801: The radar apparatus determines at least two transmit antenna groups. Specifically, the at least two transmit antenna groups include a first transmit antenna group and a second transmit antenna group. Further, the at least two transmit antenna groups may further include a third transmit antenna group, and the like. A quantity of transmit antenna groups is not specifically limited herein. It should be noted herein that any two of the at least two transmit antenna groups do not include a same transmit antenna, or at least two of the at least two transmit antenna groups include a same transmit antenna.

S802: The radar apparatus sends signals by using the at least two transmit antenna groups, where the at least two transmit antenna groups send signals in a TDM manner, and a plurality of transmit antennas included in each transmit antenna group including a plurality of transmit antennas in the at least two transmit antenna groups send signals in a CDM manner. This step may also be understood as follows: Another transmit antenna group does not send signals in a time range in which any of the at least two antenna groups send signals.

S802 may alternatively be replaced with the following:

The radar apparatus sends signals in a first time range by using the first transmit antenna group, and sends signals in a second time range by using the second transmit antenna group. Further, a plurality of transmit antennas included in the any transmit antenna group send signals by using different code.

The first time range and the second time range do not overlap in time domain. That the first time range and the second time range do not overlap in time domain herein means that there is no time in which the first time range and the second time range overlap.

Further, optionally, if the at least one transmit antenna group further includes the third transmit antenna group, the radar apparatus transmits signals in a third time range by using the third transmit antenna group. The first time range, the second time range, and the third time range do not overlap in time domain. That the first time range, the second time range, and the third time range do not overlap in time domain herein means that there is no time in which any two of the first time range, the second time range, and the third time range overlap.

It should be noted that the radar apparatus in this application may further include a plurality of transmit antenna groups. To achieve this solution of this application, any two of a plurality of transmit antenna groups send signals in time ranges that do not overlap, and a plurality of transmit antennas included in any transmit antenna group including a plurality of transmit antennas in the plurality of transmit antenna groups send signals by using different codewords. Details are not described herein again.

In this embodiment of this application, the radar apparatus may include at least three transmit antennas and at least one receive antenna. The radar apparatus may divide the included transmit antennas into at least two transmit antenna groups, and any of the two transmit antenna groups includes at least one transmit antenna. For example, the radar apparatus includes 12 transmit antennas. Then the radar apparatus may divide the 12 transmit antenna into three transmit antenna groups, may divide the 12 transmit antennas into four transmit antennas groups, or may divide the 12 transmit antennas into six transmit antenna groups. This is not limited in this embodiment of this application. It should be noted that if the radar apparatus includes three transmit antennas, one transmit antenna group inevitably includes only one transmit antenna.

In this embodiment of this application, the at least two transmit antenna groups may include a same quantity of transmit antennas or different quantities of transmit antennas. That the at least two transmit antenna groups include different quantities of transmit antennas may mean that at least two transmit antenna groups include different quantities of transmit antennas, or that each transmit antenna group includes a different quantity of transmit antennas. This may be applied to both a case in which a quantity of transmit antennas is a prime number and a case in which a quantity of transmit antennas is not a prime number. An application scope is wider.

For example, in some embodiments, the at least two transmit antenna groups may include a same quantity of transmit antennas. For example, the radar apparatus includes 12 transmit antennas. Then the radar apparatus may divide the 12 transmit antenna groups into three transmit antenna groups, and each transmit antenna group includes four transmit antennas.

For another example, in some other embodiments, the at least two transmit antenna groups may include different quantities of transmit antennas. For example, the radar apparatus includes seven transmit antennas. Then the radar apparatus may divide the seven transmit antenna groups into three transmit antenna groups. The three transmit antenna groups are a transmit antenna group 1, a transmit antenna group 2, and a transmit antenna group 3. The transmit antenna group 1 and the transmit antenna group 2 each include three transmit antennas, and the transmit antenna group 3 includes one transmit antenna. Alternatively, the radar apparatus includes six transmit antennas. Then the radar apparatus may divide the six transmit antenna groups into three transmit antenna groups. The three transmit antenna groups are a transmit antenna group 1, a transmit antenna group 2, and a transmit antenna group 3. The transmit antenna group 1 includes one transmit antenna, the transmit antenna group 2 includes two transmit antennas, and the transmit antenna group 3 includes three transmit antennas.

In this embodiment of this application, when the radar apparatus sends signals by using the at least two transmit antenna groups obtained after dividing the transmit antennas, the at least two transmit antenna groups may send signals in the TDM manner, and transmit antennas included in each transmit antenna group may send signals simultaneously. In other words, the transmit antenna groups send signals in a time division manner, and transmit antennas in a same transmit antenna group send signals simultaneously.

Figure 9:
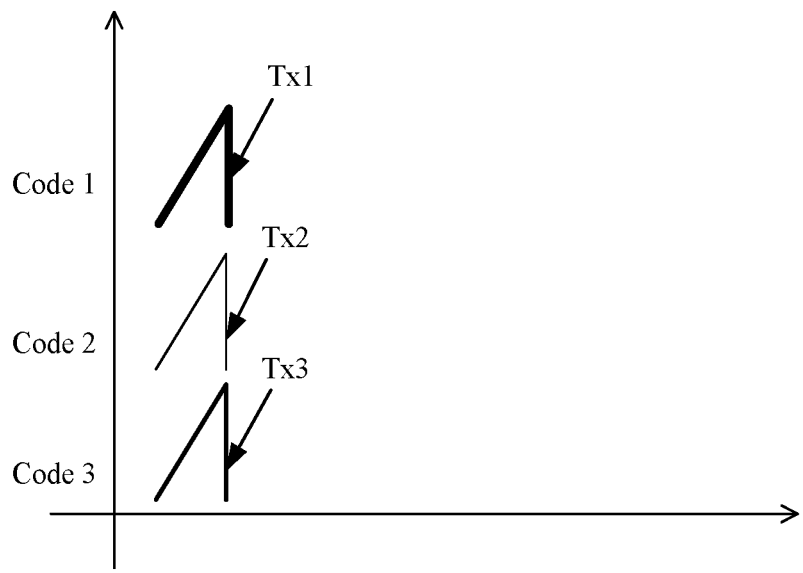
FIG. 9 is a schematic diagram in which a radar apparatus sends signals in a CDM manner.

For example, the plurality of transmit antennas included in each transmit antenna group including a plurality of transmit antennas may send signals in the CDM manner. In other words, different transmit antennas send signals by using different CDM code. Alternatively, it may be understood that different transmit antennas are numbered in respective linear FMCWs, and then send signals after being encoded. For example, FIG. 8 is a schematic diagram in which MIMO radar sends signals in a CDM manner. In FIG. 9, a horizontal coordinate t represents a time point at which a transmit antenna sends a signal, and a vertical coordinate represents CDM code. In FIG. 8, that the MIMO radar includes three transmit antennas is used as an example. The three transmit antennas are respectively a transmit antenna Tx1, a transmit antenna Tx2, and a transmit antenna Tx3. It can be learned from FIG. 9 that CDM code used by the transmit antenna Tx1 to send a signal is code 1, CDM code used by the transmit antenna Tx2 to send a signal is code 2, and CDM code used by the transmit antenna Tx3 to send a signal is code 3. In other words, different transmit antennas send signals by using different CDM code.

Certainly, a manner in which transmit antennas included in a same transmit antenna group sends signals simultaneously is not limited in this embodiment of this application. For subsequent processing performed by the radar apparatus on the received echo signal by the radar apparatus, it only needs to be ensured that a signal corresponding to each transmit antenna can be determined from the received signal. For example, based on different CDM code, the signal corresponding to each transmit antenna may be determined from a signal corresponding to each transmit antenna group.

If a transmit antenna group includes a relatively large quantity of transmit antennas, CDM code is relatively complex, and decoding complexity is increased. In addition, in consideration of precision of a phase shifter, and the like, in this embodiment of this application, simple CDM code is preferably selected. For example, binary phase shift keying (BPSK) may be used for the CDM code. For another example, quadrature phase shift keying (QPSK) may alternatively be used for the CDM code. When the radar apparatus includes a relatively large quantity of transmit antennas, it may be determined that each transmit antenna group includes two transmit antennas, three transmit antennas, or four transmit antennas in this embodiment of this application. Therefore, not only a requirement for the precision of the phase shifter can be reduced, but also decoding complexity can be reduced.

Figure 10:
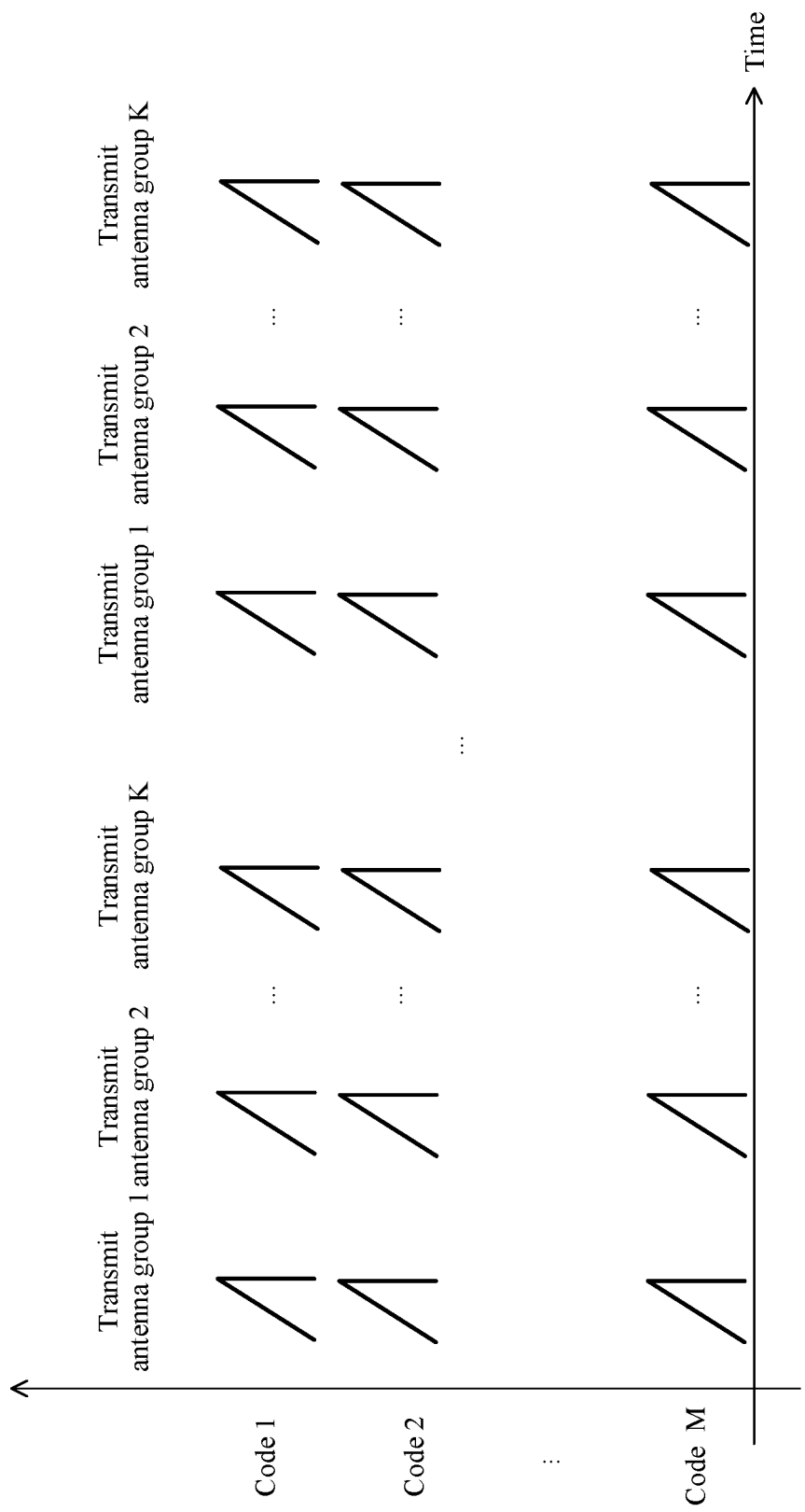
FIG. 10 is a schematic diagram in which at least two transmit antenna groups of a radar apparatus send signals according to an embodiment of this application.

It can be seen that in this embodiment of this application, the radar apparatus divides the included transmit antennas into at least two transmit antenna groups. For example, the radar apparatus divides N included transmit antennas into K transmit antenna groups. In other words, the K transmit antenna groups send signals in the time division manner. For example, FIG. 10 is a corresponding waveform diagram in which a radar apparatus sends signals. In FIG. 10, a horizontal coordinate represents a time point at which a signal is sent, and a vertical coordinate represents CDM code. In FIG. 10, that the CDM code includes M pieces of code is used as an example. In FIG. 10, a transmit antenna included in each transmit antenna group is merely an example. Because the plurality of transmit antennas included in each transmit antenna group including a plurality of transmit antennas send signals in the CDM manner, the plurality of transmit antennas included in each transmit antenna group including a plurality of transmit antennas perform encoding and then simultaneously send signals. Because the plurality of transmit antennas simultaneously send signals, a phenomenon that a velocity and an angle are coupled does not occur. Therefore, in this embodiment of this application, the phenomenon that the velocity and the angle are coupled occurs between transmit antenna groups. Therefore, FFT only needs to be performed for K times to resolve velocity ambiguity. In comparison with a case in which FFT is performed for N time in a conventional technology, a calculation amount is clearly reduced. In addition, an amount of data that needs to be stored is also reduced, thereby saving storage space. In addition, at least two transmit antennas included in a same transmit antenna group send signals simultaneously, and therefore, a signal-to-noise ratio of signals that may be accumulated in a unit time is relatively large when FFT is performed, to help detect a target.

In this embodiment of this application, that the radar apparatus divides the included transmit antennas into at least two transmit antenna groups may be randomly dividing the included transmit antennas into at least two transmit antenna groups. It may be considered that each time before the radar apparatus sends a signal, the radar apparatus randomly divides the included transmit antenna into at least two transmit antenna groups. If the radar apparatus sends a signal for a plurality of times, and each random division of the transmit antennas may be understood as a grouping manner, a plurality of random divisions correspond to a plurality of grouping manners. In this embodiment of this application, some of the plurality of grouping manners may correspond to at least two same or different transmit antenna groups. Alternatively, that the radar apparatus divides the included transmit antennas into at least two transmit antenna groups may be considered as follows: At least two transmit antenna groups corresponding to the plurality of grouping manners are random, namely, irregular.

For ease of understanding, the following describes several possible cases in which the radar apparatus randomly divides the transmit antennas into at least two transmit antenna groups. In the following, numbers of the transmit antennas included by the radar apparatus are numbers in a location sequence of the transmit antennas. For example, the numbers of the transmit antennas included by the radar apparatus are 1-N. Alternatively, in some embodiments, the numbers of the transmit antennas included by the radar apparatus are 0-N-1. Herein, N is greater than or equal to 3.

In a first case, numbers of transmit antennas included in each transmit antenna group obtained after the radar apparatus randomly divides the transmit antennas may be consecutive. For example, the radar apparatus includes 12 transmit antennas, and the 12 transmit antennas are sequentially numbered Tx1, Tx2, Tx3, Tx4, Tx5, Tx6, Tx7, Tx8, Tx9, Tx10, Tx11 and Tx12 in the location sequence. The radar apparatus randomly divides the 12 transmit antennas into three transmit antenna groups, and the three transmit antenna groups may be {Tx1, Tx2, Tx3, Tx4}, {Tx5, Tx6, Tx7, Tx8}, and {Tx9, Tx10, Tx11, Tx12}.

In a second case, numbers of transmit antennas included in each transmit antenna group obtained after the radar apparatus randomly divides the transmit antennas may be inconsecutive.

For example, at least two transmit antennas in each transmit antenna group have inconsecutive numbers. For example, the foregoing example is still used. The radar apparatus randomly divides the 12 transmit antennas into three transmit antenna groups, and the three transmit antenna groups may be {Tx1, Tx2, Tx3, Tx7}, {Tx4, Tx5, Tx6, Tx11}, and {Tx8, Tx9, Tx10, Tx12}.

For example, any two transmit antennas in each transmit antenna group have inconsecutive numbers. For example, the foregoing example is still used. The radar apparatus randomly divides the 12 transmit antennas into three transmit antenna groups, and the three transmit antenna groups may be {Tx1, Tx4, Tx7, Tx10}, {Tx2, Tx5, Tx8, Tx11}, and {Tx3, Tx6, Tx9, Tx12}.

In a third case, further, in a plurality of intervals between numbers of transmit antennas included in each transmit antenna group obtained after the radar apparatus randomly divides the transmit antennas, at least one interval is greater than 1.

For example, in each transmit antenna group, an interval between numbers of at least two transmit antennas with adjacent numbers is greater than 1. For example, the foregoing example is still used. The radar apparatus randomly divides the 12 transmit antennas into three transmit antenna groups, and the three transmit antenna groups may be {Tx1, Tx2, Tx3, Tx7}, {Tx4, Tx5, Tx6, Tx11} and {Tx8, Tx9, Tx10, Tx12}.

It should be noted that the two transmit antennas with adjacent numbers may be understood as follows: In each transmit antenna group, if two transmit antennas have consecutive numbers, it may be considered that the two transmit antennas have adjacent numbers. For example, Tx1 and Tx2 in {Tx1, Tx2, Tx3, Tx7} are two transmit antennas with adjacent numbers, and Tx2 and Tx3 are also two transmit antennas with adjacent numbers. Alternatively, the two transmit antennas with adjacent numbers may be understood as follows: In a transmit antenna group, if two transmit antennas have inconsecutive numbers, a transmit antenna corresponding to a number between the numbers of the two transmit antennas does not belong to the transmit antenna group. For example, Tx3 and Tx7 in {Tx1, Tx2, Tx3, Tx7} are two transmit antennas with inconsecutive numbers, but Tx4, Tx5, and Tx6 do not belong to {Tx1, Tx2, Tx3, and Tx7}. Tx3 and Tx7 are two transmit antennas with adjacent numbers.

For another example, in each transmit antenna group, an interval between numbers of any two transmit antennas with adjacent numbers is greater than 1. For example, the foregoing example is still used. The radar apparatus randomly divides the 12 transmit antennas into three transmit antenna groups, and the three transmit antenna groups may be {Tx1, Tx6, Tx9, Tx12}, {Tx2, Tx5, Tx7, Tx11} and {Tx3, Tx8, Tx10, and Tx12}.

In this embodiment of this application, each time before the radar apparatus sends a signal, the radar apparatus may randomly divide the transmit antennas into at least two transmit antenna groups. At least two same or different corresponding transmit groups may send signals at different times. For example, the foregoing example is still used. That the radar apparatus sends a signal for two times is used as an example. When the radar apparatus sends a signal for the $1^{st}$ time and the $2^{nd}$ time, at least two determined transmit antenna groups are {Tx1, Tx6, Tx9, Tx12}, {Tx2, Tx5, Tx7, Tx11}, and {Tx3, Tx8, Tx10, Tx12}. For another example, when the radar apparatus sends a signal for the $1^{st}$ time, at least two determined transmit antenna groups are {Tx1, Tx4, Tx7, Tx10}, {Tx2, Tx5, Tx8, Tx11}, and {Tx3, Tx6, Tx9, Tx12}. When the radar apparatus sends a signal for the $2^{nd}$ time, the at least two determined transmit antenna groups are {Tx1, Tx6, Tx9, Tx12}, {Tx2, Tx5, Tx7, Tx11}, and {Tx3, Tx8, Tx10, Tx12}.

The radar apparatus randomly divides the included transmit antennas into at least two transmit antenna groups, so that a phase jump between virtual antenna array elements may be increased, to help distinguish a target peak value of a range-Doppler domain representation, and improve velocity ambiguity resolution performance.

Figure 11:
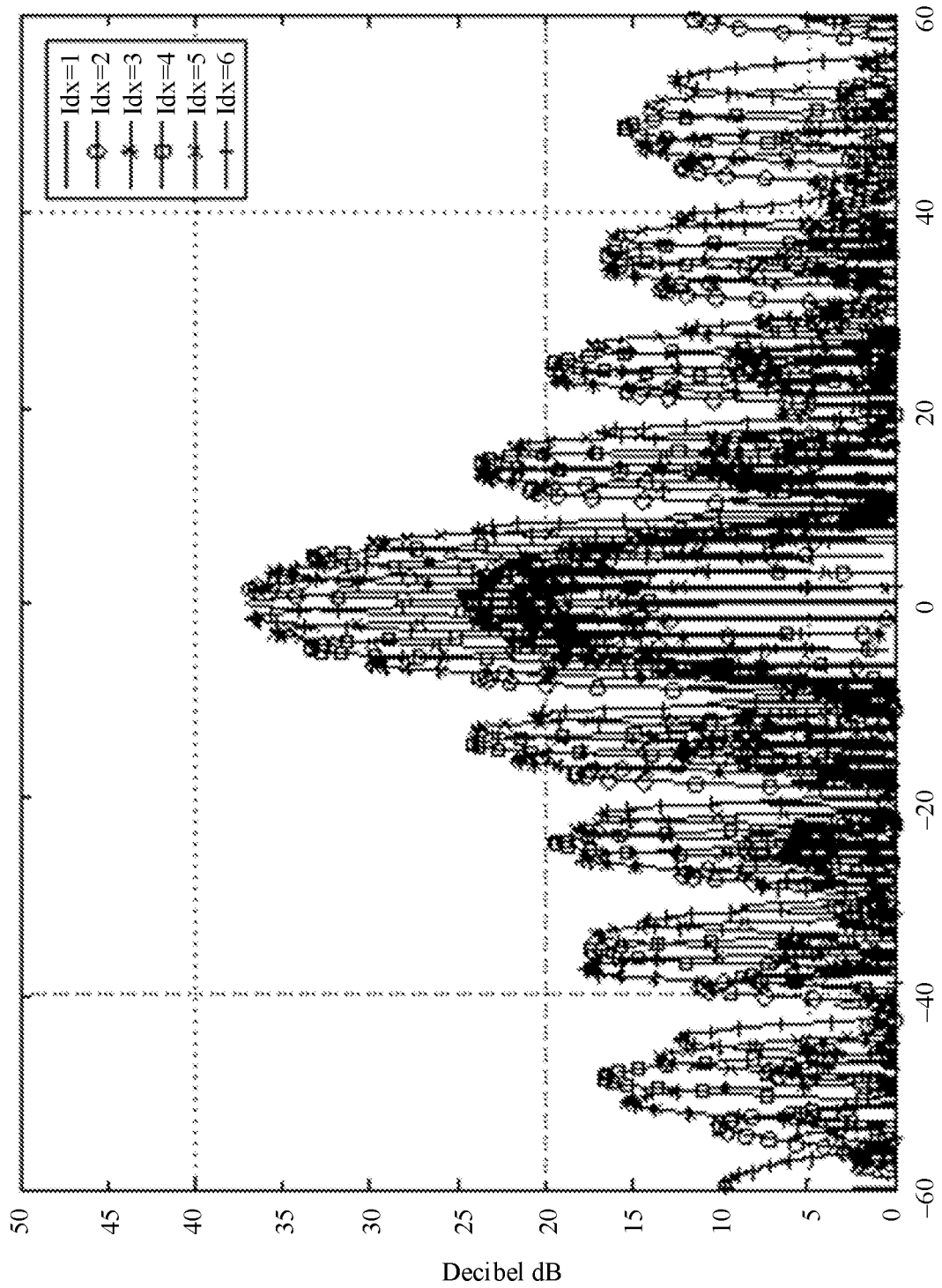
FIG. 11 is a schematic diagram of an angle-domain FFT result corresponding to a transmit antenna group according to an embodiment of this application.
Figure 12:
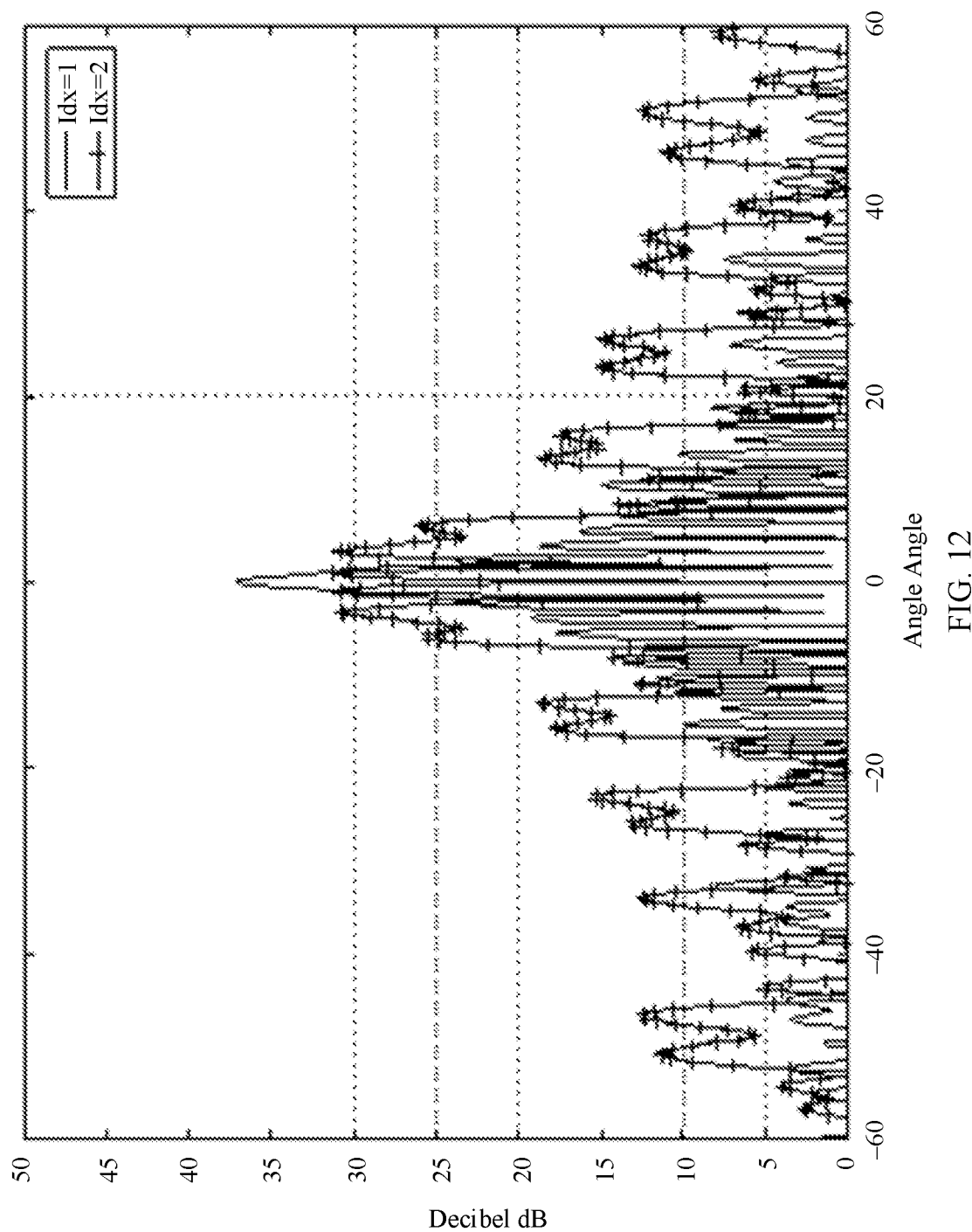
FIG. 12 is a schematic diagram of an angle-domain FFT result corresponding to another transmit antenna group according to an embodiment of this application.

For example, FIG. 11 is a schematic diagram of an angle-domain FFT result corresponding to a case in which transmit antennas included in a same transmit antenna group have consecutive numbers, and FIG. 12 is a schematic diagram of an angle-domain FFT result corresponding to a case in which transmit antennas included in a same transmit antenna group have inconsecutive numbers. In FIG. 11 and FIG. 12, that the radar apparatus includes six transmit antennas is used as an example. The six transmit antennas in FIG. 11 send signals in the TDM manner. It is assumed that a velocity ambiguity coefficient is 1, and a minimum phase jump between the virtual antenna array elements is 60°. To be specific, phases are [0°, 60°, 120°, 180°, 240°, 300°]. The six transmit antennas in FIG. 12 are divided into two transmit antenna groups. It is assumed that a velocity ambiguity coefficient is 1, and a Doppler phase of the $1^{st}$ transmit antenna group is 0°. Therefore, a phase jump of the $2^{nd}$ transmit antenna group relative to the $1^{st}$ transmit antenna group is 180°. For example, the two transmit antenna groups are {transmit antenna 1, transmit antenna 4, transmit antenna 6} and {transmit antenna 3, transmit antenna 5, transmit antenna 2}, and a minimum phase jump between virtual antenna array elements is 180°. To be specific, phases are [180°, 0°, 0°, 180°, 0°, 180°]. FIG. 11 and FIG. 12 are compared, and it can be seen that the transmit antenna group is randomly divided into at least two transmit antenna groups, and a target peak value of the FFT result shown in FIG. 12 is more easily distinguished, to help detect a target. In this embodiment of this application, the transmit antenna group is randomly divided into at least two transmit antenna groups, so that the phase jump between the virtual antenna array elements changes randomly, and the velocity and the angle are not easily coupled. In addition, because the transmit antennas are divided into at least two transmit antenna groups, the phase jump changes from 600 to 180°, and is not easily affected by phase noise, so that a maximum peak value of the FFT result in the angle domain is more easily distinguished, and velocity ambiguity resolution performance is improved. In addition, in this embodiment of this application, the transmit antenna group is randomly divided into at least two transmit antenna groups, so that a calculation amount can be reduced.

In some embodiments, in consideration that at least two different transmit antenna groups are used to send signals, the radar apparatus determines a real velocity of a target object based on a signal obtained after the signals sent by the radar apparatus are reflected by the target object. A velocity ambiguity resolution process is involved in a process of determining the real velocity of the target object. However, the radar apparatus, for example, sends signals by using at least two transmit antenna groups obtained through a random division, and at least two different transmit antenna groups may result in different velocity ambiguity resolution performance of the radar apparatus. For example, if transmit antennas included in the at least two transmit antenna groups have consecutive numbers, a phenomenon that the velocity and the angle are coupled easily occurs, the phase jump between the virtual antenna array elements of the radar apparatus is relatively small, and the velocity ambiguity resolution performance is relatively poor. However, if transmit antennas included in the at least two transmit antenna groups have inconsecutive numbers, in comparison with the case in which the transmit antennas included in the at least two transmit antenna groups have consecutive numbers, the phenomenon that the velocity and the angle are coupled does not easily occur, the phase jump between the virtual antenna array elements of the radar apparatus is relatively large, and the velocity ambiguity resolution performance is relatively good. Preferably, in each transmit antenna group, the interval between the numbers of any two transmit antennas with adjacent numbers may be relatively large, to maximize the phase jump between the virtual antenna array elements, and reduce the phenomenon that the velocity and the angle are coupled.

It should be noted that the real velocity herein is not necessarily an actual velocity of movement of the target object, and may be a velocity that does not affect measurement of an angle of the target object relative to the radar.

Further, in actual use of the radar apparatus, velocity ambiguity resolution performance corresponding to the plurality of grouping manners may be compared. In a grouping manner, it may be considered that the radar apparatus performs one random division, to obtain the at least two transmit antenna groups. Therefore, the radar apparatus determines the at least two transmit antenna groups based on a grouping manner corresponding to optimal velocity ambiguity resolution performance, namely, a first grouping manner. In a preset time range, the radar apparatus randomly divides the transmit antennas for a plurality of times, and at least two transmit antenna groups determined through each division correspond to a grouping manner. The plurality of grouping manners may correspond to at least two same or different transmit antenna groups. For example, in the preset time range, the radar apparatus randomly divides the transmit antennas for five times. Then, there is a first grouping manner, a second grouping manner, a third grouping manner, a fourth grouping manner, and a fifth grouping manner. The five grouping manners may correspond to at least two same or different transmit antenna groups. It is assumed that the grouping manner corresponding to the optimal velocity ambiguity resolution performance is the first grouping manner. That the radar apparatus selects the first grouping manner may be considered as follows: The radar apparatus determines velocity ambiguity resolution performance corresponding to at least two transmit antenna groups corresponding to each of the five grouping manners, and therefore, selects at least two transmit antenna groups corresponding to the optimal velocity ambiguity resolution performance. Therefore, the radar apparatus may subsequently send signals by using the at least two transmit antenna groups, without a need to re-determine at least two transmit antenna groups each time, so that not only it can be ensured as much as possible that subsequent velocity ambiguity resolution performance is relatively good, but also load of the radar apparatus can be reduced.

Velocity ambiguity resolution performance may be represented by a performance parameter corresponding to a grouping manner. For example, the performance parameter may be angle estimation precision or a success rate of velocity ambiguity resolution. The radar apparatus may determine velocity ambiguity resolution performance based on a value of the performance parameter. For example, the performance parameter is the angle estimation precision or the success rate of the velocity ambiguity resolution. Therefore, a larger value of the performance parameter indicates better velocity ambiguity resolution performance. In performance parameters corresponding to the plurality of grouping manners, a largest value of a performance parameter indicates that the performance parameter is optimal and velocity ambiguity resolution performance is optimal.

In some embodiments, the radar apparatus may determine the first grouping manner in the plurality of grouping manners within the preset time range. The preset time range may be obtained based on experience in an actual use process of the radar apparatus. This is not limited in this embodiment of this application.

In this embodiment of this application, the radar apparatus divides the N transmit antennas into the K transmit antenna groups, the K transmit antenna groups send signals in the TDM manner, and a plurality of transmit antennas included in each transmit antenna group including a plurality of transmit antennas in the K transmit antenna groups send signals in the CDM manner. Therefore, FFT only needs to be performed for K times to resolve velocity ambiguity, so that a calculation amount is reduced. In addition, the transmit antennas included in each transmit antenna group send signals in the CDM manner, and therefore, a signal-to-noise ratio of signals that may be accumulated in the unit time is relatively large when FFT is performed, to help detect a target.

In the foregoing embodiment, how to send a signal is described, to reduce the calculation amount of velocity ambiguity resolution in a subsequent process of determining the velocity of the target object. Correspondingly, an embodiment of this application further provides a signal processing method. The signal processing method may be considered as a velocity ambiguity resolution method. The method may be performed by a radar detection apparatus, the radar detection apparatus may be a radar chip, or may be a communications apparatus that communicates with radar, for example, a vehicle-mounted communications apparatus. For ease of description, in this embodiment of this application, that the radar detection apparatus is a radar apparatus, for example, millimeter-wave radar, is used as an example in most cases below, to explain and describe this embodiment. However, in this embodiment of this application, a detection apparatus is not limited to only the radar detection apparatus, and the radar detection apparatus is not limited to only the millimeter-wave radar or the radar. In addition, a signal sent by the detection apparatus may be a radio signal. If that the detection apparatus is a radar detection apparatus is used as an example, it may be considered that the signal sent by the detection apparatus is a radar signal. In this embodiment of this application, that the detection apparatus is a radar detection apparatus, and the signal sent by the detection apparatus is a radar signal is used as an example.

Figure 13:
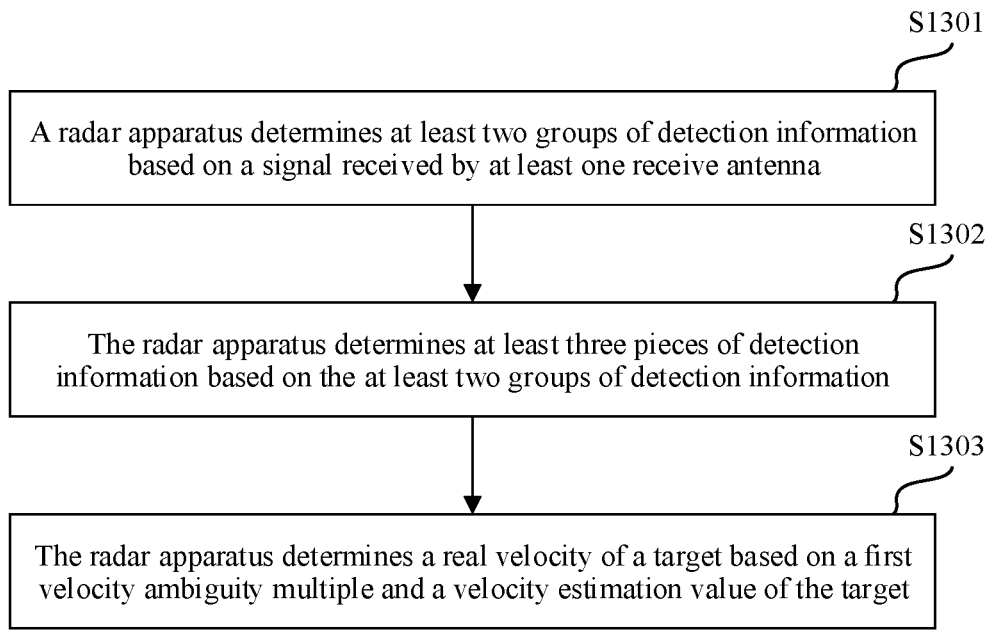
FIG. 13 is a schematic flowchart of a signal processing method according to an embodiment of this application.

FIG. 13 is a flowchart of a signal processing method according to an embodiment of this application. In the following description, the method is applied to a radar apparatus, and the radar apparatus includes at least three transmit antennas and at least one receive antenna. A specific procedure of the method is as follows:

S1301: The radar apparatus determines at least two groups of detection information based on a signal received by the at least one receive antenna.

When a surrounding target object needs to be detected, for example, when a range or an angle of the surrounding target object relative to the radar apparatus, or a velocity of the target object needs to be determined, the radar apparatus may transmit a radar signal by using the included transmit antennas. If there is a plurality of target objects around the radar apparatus, and the plurality of target objects are within a maximum ranging range of the radar apparatus, the radar signal transmitted by the radar apparatus is reflected by the plurality of target objects to the radar apparatus, so that the radar apparatus receives at least one signal from the target objects.

The radar apparatus receives the at least one signal, and may process the at least one signal, to detect the target objects around the radar apparatus.

Two transmit antenna groups obtained by dividing the transmit antennas of the radar apparatus send signals in a TDM manner, and a plurality of transmit antennas included in each transmit antenna group including a plurality of transmit antennas send signals in a CDM manner. In other words, different transmit antenna groups send signals at different start time points. Therefore, signals sent by different transmit antenna groups have different features. The radar apparatus may extract signals corresponding to different transmit antenna groups from the at least one received signal based on different radar signals sent by different transmit antenna groups. That the radar apparatus extracts the signals corresponding to different transmit antenna groups from the at least one received signal may also be understood as follows: The radar apparatus divides the at least one received signal into at least two groups of signals based on the at least two transmit antenna groups, and one transmit antenna group corresponds to one group of signals.

For ease of description, in the following description, that the radar apparatus includes two transmit antenna groups is used as an example. The two transmit antenna groups are respectively a first transmit antenna group and a second transmit antenna group. A signal that corresponds to the first transmit antenna group and that is extracted by the radar apparatus from the at least one signal is a first group of signals, and a signal that corresponds to the second transmit antenna group and that is extracted by the radar apparatus from the at least one signal is a second group of signals.

After the radar apparatus extracts the first group of signals and the second group of signals, the radar apparatus respectively processes the first group of signals and the second group of signals, to obtain two groups of detection information for detecting the target object. For example, the radar apparatus separately converts the first group of signals and the second group of signals into a range-Doppler domain, to obtain the two groups of detection information, for example, a first group of detection information and a second group of detection information. A first signal corresponds to the first group of detection information, and a second signal corresponds to the second group of detection information. It should be noted that if the radar apparatus includes at least three transmit antenna groups, the radar apparatus may determine at least three groups of detection information based on the at least one signal, and the transmit antenna groups are in a one-to-one correspondence with detection information groups. For example, the radar apparatus includes a transmit antenna group 1, a transmit antenna group 2, and a transmit antenna group 3, determined detection information includes a detection information group 1 corresponding to the transmit antenna group 1, a detection information group 2 corresponding to the transmit antenna group 2, and a detection information group 3 corresponding to the transmit antenna group 3.

It should be noted that the detection information herein may also be referred to as a detection signal. Detection information included in at least two groups of detection information may be understood as information for determining a feature of the target object. For example, the detection information may be information for representing the range or the velocity of the target object relative to the radar apparatus, or a radar cross section (RCS). For example, the detection information may be a range or a velocity of a target relative to the radar apparatus, or an RCS. Alternatively, the detection information may be a grid point or a sampling point sequence number in two-dimensional data obtained after sampling and quantization is performed on a signal, the grid point or the sampling point sequence number may represent the range of the target object relative to the radar apparatus. The detection information has a plurality of forms, and examples are not provided herein. Certainly, if the radar apparatus includes at least two receive antennas, the detection information may further include information for representing the angle of the target object relative to the radar apparatus.

Specifically, in a possible solution, the radar apparatus processes the first group of signals or the second group of signals. For a method for obtaining the corresponding two groups of detection information, refer to the foregoing method in which the radar apparatus determines the range and velocity of the target object relative to the radar apparatus based on an intermediate frequency signal. To be specific, the first group of signals and a local-frequency signal are mixed, to obtain an intermediate frequency signal, and the intermediate frequency signal is converted into a range-Doppler domain, to obtain the two groups of detection information.

S1302. The radar apparatus determines at least three pieces of detection information based on the at least two groups of detection information.

After obtaining the at least two groups of detection information, the radar apparatus may continue to separate the at least two groups of detection information based on different CDM code corresponding to transmit antennas included in each transmit antenna group, to obtain the at least three pieces of detection information. One piece of detection information corresponds to one transmit antenna. The at least three pieces of detection information are used to determine a velocity estimation value of the target object, in other words, are used to detect a velocity of the target object. The detected velocity of the target object may be ambiguous. Therefore, the velocity may be referred to as the velocity estimation value of the target object herein. Certainly, before obtaining the at least three pieces of detection information, the radar apparatus may perform non-coherent accumulation and constant false alarm rate (CFAR) detection on the at least two groups of separated detection information based on each transmit antenna.

The at least three pieces of detection information may be used to determine a location and the velocity of the target object. However, the determined velocity may be ambiguous due to a phase jump between the transmit antennas that is caused by a Doppler frequency shift. Therefore, to obtain a real velocity of the target object, the radar apparatus may resolve velocity ambiguity. For ease of differentiation, in the following, a velocity that is of the target object and that is determined based on at least four pieces of detection information is referred to as the velocity estimation value of the target object, and a velocity that is of the target object and that is determined after velocity ambiguity resolution is referred to as the real velocity of the target object. It should be noted that the real velocity herein is a velocity that does not affect measurement of the angle of the target object.

S1303: The radar apparatus determines the real velocity of the target based on a first velocity ambiguity multiple and the velocity estimation value of the target.

There may be a plurality of velocity ambiguity multiples, and a quantity of velocity ambiguity multiples is the same as a quantity of the at least two transmit antenna groups. Some of the plurality of velocity ambiguity multiples are wrong, and some are correct. A correct velocity ambiguity multiple is referred to as a first velocity ambiguity multiple below. A process in which the radar apparatus resolves velocity ambiguity may be understood as a process of determining the first velocity ambiguity multiple, namely, a process of determining a correct value of J.

For example, the radar apparatus may determine a plurality of phases of a plurality of virtual antenna array elements. The virtual antenna array element herein is a virtual antenna array element including a transmit antenna and a receive antennas included by the radar apparatus. For example, in FIG. 3, if the radar apparatus includes three transmit antennas and four receive antennas, the radar apparatus correspondingly includes 12 virtual antenna array elements, and one virtual antenna array element corresponds to one transmit antenna and one receive antenna. The plurality of phases of the plurality of virtual antenna array elements may be understood as all phases, namely, $\pi_{n,k}(\xi)$.

Then the radar apparatus may separately perform Doppler phase compensation for the plurality of phases. To be specific, a determined value of $\tilde{\pi}_{n,k}(\xi)$ is reduced by a Doppler phase that may be ambiguous, and the Doppler phase compensation may be specifically performed according to the following formula (11):

$$\tilde{\phi}_{n,k}(\xi) = \phi_{n,k}(\xi) - 2\pi\left(f_{damb}T_r + \frac{\xi}{N}\right)(k-1) \quad (11)$$

In the formula (11), $\tilde{\pi}_{n,k}(\xi)$ is a phase of each virtual antenna array element after Doppler phase compensation. Herein, $f_{damb}$ is a Doppler frequency shift, N is a quantity of transmit antennas, k is a number of a transmission ranking corresponding to a virtual antenna array element, $\xi=0, \ldots N-1$ is an ambiguity coefficient and represents N possible Doppler ambiguity phases, and Tr is a time interval at which two adjacent transmit antenna groups send signals in time domain. The radar apparatus may obtain N possible phase-compensated signals according to the formula (11).

The radar apparatus determines the velocity ambiguity multiple by performing an angle-domain FFT ambiguity resolution method. Specifically, the radar apparatus converts a signal obtained after compensation into the angle domain. In other words, FFT processing is performed on the signal obtained after compensation in the angle domain. Alternatively, it may be understood that the at least three pieces of detection information are superimposed in the angle domain to obtain N groups of FFT results.

If the radar apparatus selects a correct value of $\xi$, a phase of the $n^{th}$ virtual antenna array element is as follows:

$$\phi_{n,k}(\xi) - 2\pi\left(f_{damb}T_r + \frac{\xi}{N}\right)(k-1) = 2\pi\frac{d_{r\_x}\sin\theta(n-1)}{\lambda} \quad (12)$$

It can be seen from the formula (12) that if the radar device selects the correct value of $\xi$, the phase of each virtual antenna array element includes only angle information, in other words, is unrelated to the velocity, so that the velocity and the angle are decoupled, in other words, the velocity ambiguity is successfully resolved.

The radar apparatus performs FFT processing on the signal obtained through compensation in the angle domain, so that more beam energy can be accumulated, thereby helping detect a maximum peak value of the FFT result, namely, a maximum value of the beam energy. However, a velocity ambiguity multiple corresponding to the maximum peak value is a correct velocity ambiguity multiple, namely, the first velocity ambiguity multiple.

The radar apparatus determines the first velocity ambiguity multiple, and may determine a Doppler frequency shift $f_d$ that is of an echo signal received by radar and that is relative to a signal transmitted by the transmit antenna of the radar, according to a formula (13):

$$f_d = f_{damb} + \frac{\hat{\xi}}{T_r} \quad (13)$$

In the formula (12), $\hat{\xi}$ is an estimation value of the first velocity ambiguity multiple, $f_{damb}$ is a Doppler frequency shift, and Tr is a time interval at which two adjacent transmit antenna groups send signals in time domain. Because the first velocity ambiguity multiple is correct, $f_d$ is also close to a real value. Therefore, a velocity that is of the target object and that is determined by the radar apparatus based on $f_d$ is also close to the real velocity of the target object. Specifically, the radar apparatus determines that the real velocity v of the target object is $$v = \frac{f_d \lambda}{2}.$$

In this embodiment of this application, the radar apparatus divides N transmit antennas into K transmit antenna groups, the K transmit antenna groups send signals in the TDM manner, and a plurality of transmit antennas included in each transmit antenna group including a plurality of transmit antennas in the K transmit antenna groups send signals in the CDM manner. Therefore, FFT only needs to be performed for K times to resolve velocity ambiguity, so that a calculation amount is reduced. In addition, a plurality of transmit antennas included in each transmit antenna group including a plurality of transmit antennas send signals in the CDM manner, and therefore, a signal-to-noise ratio of signals that may be accumulated in a unit time is relatively large when FFT is performed, to help detect a target.

The foregoing mainly describes the solutions provided in the embodiments of this application from a perspective of sending a signal and processing a signal by a radar apparatus. The following describes, with reference to the accompanying drawings, apparatuses configured to implement the foregoing methods in the embodiments of this application. Therefore, all the foregoing content may be used in the following embodiments, and repeated content is not described again.

It may be understood that to implement the foregoing functions, each apparatus, such as the radar apparatus, includes corresponding hardware structures and/or software modules for performing the functions. A person skilled in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, functional modules of the radar apparatus may be obtained through division. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 14:
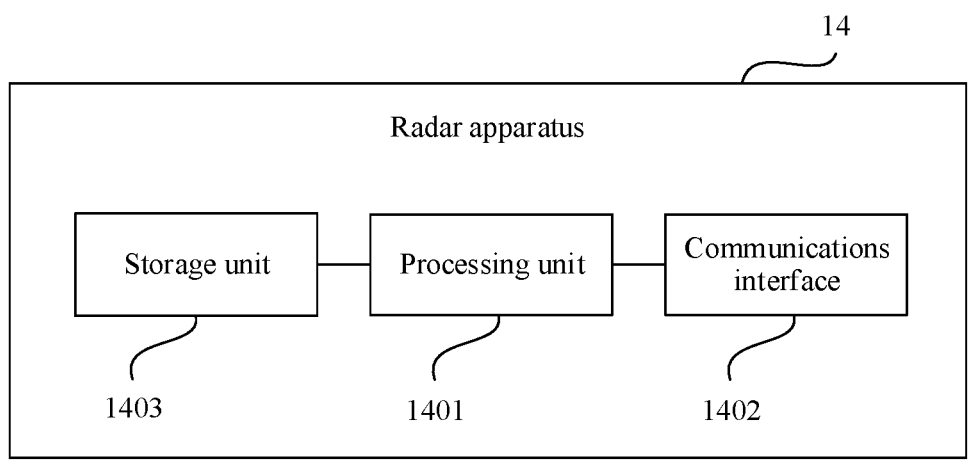
FIG. 14 is a schematic structural diagram of a radar apparatus according to an embodiment of this application.

For example, when each functional module of the radar apparatus is obtained through division in an integration manner, FIG. 14 is a possible schematic structural diagram of the radar apparatus in the foregoing embodiments of this application. The radar apparatus 14 may include a processing unit 1401, a communications interface 1402 and a storage unit 1403. The communications interface 1402 may also be referred to as an interface unit.

In a first design, the processing unit 1401 may be configured to perform or control all operations, except receiving and sending operations, performed by the radar apparatus in the embodiment shown in FIG. 8, for example, S801, and/or configured to support another process of the technology described in this specification. The communications interface 1402 may be configured to perform all receiving and sending operations performed by the radar apparatus in the embodiment shown in FIG. 8, for example, S802, and/or configured to support another process of the technology described in this specification. The radar apparatus includes at least three transmit antennas.

The processing unit 1401 is configured to determine at least two transmit antenna groups of the radar apparatus, where each transmit antenna group includes at least one transmit antenna.

The communications interface 1402 is configured to control the at least two transmit antenna groups to send signals, where the at least two transmit antenna groups send signals in a time division multiplexing TDM manner, and a plurality of transmit antennas included in each transmit antenna group including a plurality of transmit antennas in the at least two transmit antenna groups send signals in a CDM manner.

In an optional design, the processing unit 1401 is specifically configured to:
randomly determine the at least two transmit antenna groups based on the at least three transmit antennas.

In an optional design, numbers of transmit antennas included by the radar apparatus range from 1 to N, N is greater than or equal to 3, and at least two transmit antennas in each transmit antenna group have inconsecutive numbers; or any two transmit antennas in each transmit antenna group have inconsecutive numbers.

In an optional design, in each transmit antenna group, an interval between numbers of at least two transmit antennas with adjacent numbers is greater than 1, or an interval between numbers of any two transmit antennas with adjacent numbers is greater than 1.

In an optional design, the processing unit 1401 is specifically configured to:
determine a first grouping manner in a plurality of grouping manners, where the at least two transmit antenna groups indicated by the first grouping manner correspond to an optimal performance parameter, and the performance parameter is used to indicate velocity ambiguity resolution performance.

In an optional design, the plurality of grouping manners include all possible grouping manners of the at least two transmit antenna groups.

In an optional design, quantities of transmit antennas included in the at least two transmit antenna groups are different or the same.

Alternatively, in another design, the processing unit 1401 may be configured to perform all operations, except receiving and sending operations, performed by the radar apparatus in the embodiment shown in FIG. 13, for example, S1302 and S1303, and/or configured to support another process of the technology described in this specification. The communications interface 1402 may be configured to perform or control all receiving and sending operations performed by the radar apparatus in the embodiment shown in FIG. 13, for example, S1301, and/or configured to support another process of the technology described in this specification.

The communications interface 1402 is configured to receive at least one signal.

The processing unit 1401 is configured to: determine at least two groups of detection information based on the signal received by the communications interface 1402, where the at least two groups of detection information correspond to at least two transmit antenna groups including at least three transmit antennas, each transmit antenna group includes at least one transmit antenna, the at least two transmit antenna groups send signals in a TDM manner, and a plurality of transmit antennas included in each transmit antenna group including a plurality of transmit antennas in the at least two transmit antenna groups send signals in a CDM manner;
determine at least three pieces of detection information based on the at least two groups of detection information, where the at least three pieces of detection information are used to determine a velocity estimation value of a target, and the at least three pieces of detection information correspond to the at least three transmit antennas; and
determine a real velocity of the target based on a first velocity ambiguity multiple and the velocity estimation value of the target, where the first velocity ambiguity multiple is one of at least two velocity ambiguity multiples corresponding to the at least two groups of detection information.

In an optional design, the processing unit 1401 is specifically configured to:
separately convert the at least two groups of signals into a range-Doppler domain, to obtain the at least two groups of detection information, where
the at least two groups of signals are signals corresponding to the at least two transmit antenna groups in the received signal.

In an optional design, the processing unit 1401 is specifically configured to:
determine a plurality of phases of a plurality of virtual antenna array elements included by the radar apparatus, where the virtual antenna array element corresponds to one transmit antenna and one receive antenna, and one virtual antenna array element corresponds to one phase;
separately perform Doppler phase compensation for the plurality of phases; and
superimpose at least two pieces of detection information in an angle domain, and determine a velocity ambiguity multiple based on a superimposition result.

In an optional design, the processing unit 1401 is specifically configured to:
determine a velocity ambiguity multiple corresponding to a maximum peak value in the superposition result as the velocity ambiguity multiple.

In another design, an optional design may be independently implemented, or may be integrated with any one of the foregoing optional designs for implementation.

Figure 15:
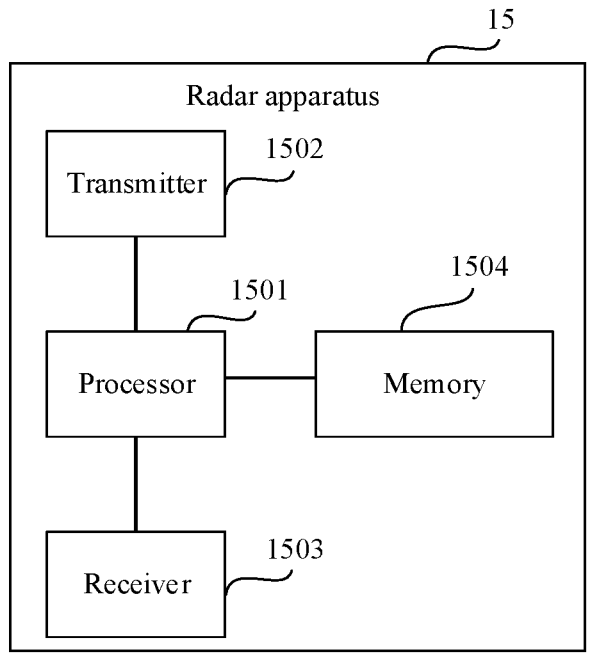
FIG. 15 is another schematic structural diagram of a radar apparatus according to an embodiment of this application.

FIG. 15 is another possible schematic structural diagram of a radar apparatus according to an embodiment of this application. The radar apparatus 15 may include a processor 1501, a transmitter 1502, and a receiver 1503. Functions of the processor 1501, the transmitter 1502, and the receiver 1503 may respectively correspond to specific functions of the processing unit 1401 and the communications interface 1402 shown in FIG. 14, and details are not described herein again. The communications interface 1402 may be implemented by using the transmitter 1502 and the receiver 1503. Optionally, the radar apparatus 15 may further include a memory 1504, configured to store program instructions and/or data for the processor 1501 to read.

Figure 16:
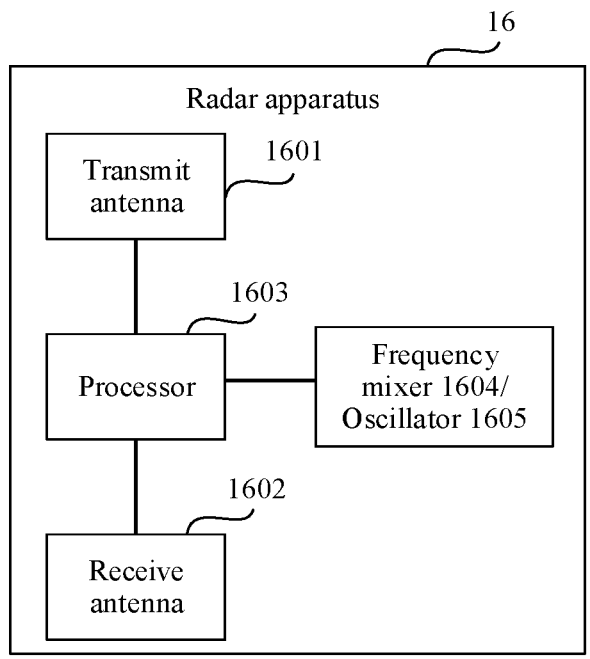
FIG. 16 is still another schematic structural diagram of a radar apparatus according to an embodiment of this application.

FIG. 2 is the schematic structural diagram of the radar apparatus. Referring to the foregoing content, another optional manner is provided. FIG. 16 is still another possible schematic structural diagram of a radar apparatus. The radar apparatuses provided in FIG. 14 to FIG. 16 may be a part or all of a radar apparatus in an actual communication scenario, or may be a functional module integrated into the radar apparatus or located outside the radar apparatus, for example, may be a chip system. Specifically, provided that a corresponding function is implemented, a structure and composition of the radar apparatus are not specifically limited.

In this optional manner, the radar apparatus 16 includes a transmit antenna 1601, a receive antenna 1602, and a processor 1603. Further, the radar apparatus further includes a frequency mixer 1604 and/or an oscillator 1605. Further, the radar apparatus 16 may further include a low-pass filter, and/or a coupler, and the like. The transmit antenna 1601 and the receive antenna 1602 are configured to support the detection apparatus in performing radio communication, the transmit antenna 1601 supports transmission of a radar signal, and the receive antenna 1602 supports reception of a radar signal and/or reception of a reflected signal, to finally implement a detection function. The processor 1603 performs some possible determining and/or processing functions. Further, the processor 1603 further controls operations of the transmit antenna 1601 and/or the receive antenna 1602. Specifically, the processor 1603 controls the transmit antenna 1601 to transmit a signal that needs to be transmitted, and a signal received by the receive antenna 1602 may be transmitted to the processor 1603 for corresponding processing. The components included in the radar apparatus 16 may be configured to cooperate to perform the method provided in the embodiment shown in FIG. 8 or FIG. 13. Optionally, the radar apparatus may further include a memory, configured to store program instructions and/or data. The transmit antenna 1601 and the receive antenna 1602 may be independently disposed, or may be integrated as a transmit/receive antenna to perform a corresponding transmit/receive function.

In a first design, the processor 1603 may be configured to perform all operations, except receiving and sending operations, performed by the radar apparatus in the embodiment shown in FIG. 8, for example, S801, and/or configured to support another process of the technology described in this specification. The transmit antenna 1601 and the receive antenna 1602 may be configured to perform all receiving and sending operations performed by the radar apparatus in the embodiment shown in FIG. 8, for example, S802, and/or configured to support another process of the technology described in this specification. The transmit antenna 1601 includes at least three transmit antennas.

The processor 1603 is configured to determine at least two transmit antenna groups of the radar apparatus, where each transmit antenna group includes at least one transmit antenna.

The transmit antenna 1601 is configured to send signals by using the at least two transmit antenna groups, where the at least two transmit antenna groups send signals in a time division multiplexing TDM manner, and a plurality of transmit antennas included in each transmit antenna group including a plurality of transmit antennas in the at least two transmit antenna groups send signals in a code division multiplexing CDM manner.

In an optional design, the processor 1603 is specifically configured to:
    randomly determine the at least two transmit antenna groups based on the at least three transmit antennas.

In an optional design, numbers of transmit antennas included by the radar apparatus range from 1 to N, N is greater than or equal to 3, and at least two transmit antennas in each transmit antenna group have inconsecutive numbers; or any two transmit antennas in each transmit antenna group have inconsecutive numbers.

In an optional design, in each transmit antenna group, an interval between numbers of at least two transmit antennas with adjacent numbers is greater than 1, or an interval between numbers of any two transmit antennas with adjacent numbers is greater than 1.

In an optional design, the processor 1603 is specifically configured to:
    determine a first grouping manner in a plurality of grouping manners, where the at least two transmit antenna groups indicated by the first grouping manner correspond to an optimal performance parameter, and the performance parameter is used to indicate velocity ambiguity resolution performance.

In an optional design, the plurality of grouping manners include all possible grouping manners of the at least two transmit antenna groups.

In an optional design, quantities of transmit antennas included in the at least two transmit antenna groups are different or the same.

Alternatively, in another design, the processor 1603 may be configured to perform all operations, except receiving and sending operations, performed by the radar apparatus in the embodiment shown in FIG. 13, for example, S1302 and S1303, and/or configured to support another process of the technology described in this specification. The transmit antenna 1601 and the receive antenna 1602 may be configured to perform all receiving and sending operations performed by the radar apparatus in the embodiment shown in FIG. 13, for example, S1301, and/or configured to support another process of the technology described in this specification. The receive antenna 1602 includes at least one receive antenna.

The receive antenna 1602 is configured to receive at least one signal by using the at least one receive antenna.

The processor 1603 is configured to: determine at least two groups of detection information based on the signal received by the receive antenna 1602, where the at least two groups of detection information correspond to at least two transmit antenna groups including at least three transmit antennas, each transmit antenna group includes at least one transmit antenna, the at least two transmit antenna groups send signals in a TDM manner, and a plurality of transmit antennas included in each transmit antenna group including a plurality of transmit antennas in the at least two transmit antenna groups send signals in a CDM manner;
    determine at least three pieces of detection information based on the at least two groups of detection information, where the at least three pieces of detection information are used to determine a velocity estimation value of a target, and the at least three pieces of detection information correspond to the at least three transmit antennas; and
    determine a real velocity of the target based on a first velocity ambiguity multiple and the velocity estimation value of the target, where the first velocity ambiguity multiple is one of at least two velocity ambiguity multiples corresponding to the at least two groups of detection information.

In an optional design, the processor 1603 is specifically configured to:

separately convert the at least two groups of signals into a range-Doppler domain, to obtain the at least two groups of detection information, where the at least two groups of signals are signals corresponding to the at least two transmit antenna groups in the received signal.

In an optional design, the processor 1603 is specifically configured to:

determine a plurality of phases of a plurality of virtual antenna array elements included by the radar apparatus, where the virtual antenna array element corresponds to one transmit antenna and one receive antenna, and one virtual antenna array element corresponds to one phase;

separately perform Doppler phase compensation for the plurality of phases; and superimpose at least two pieces of detection information in an angle domain, and determine a velocity ambiguity multiple based on a superimposition result.

In an optional design, the processing unit processor 1603 is specifically configured to:

determine a velocity ambiguity multiple corresponding to a maximum peak value in the superposition result as the velocity ambiguity multiple.

Figure 17:
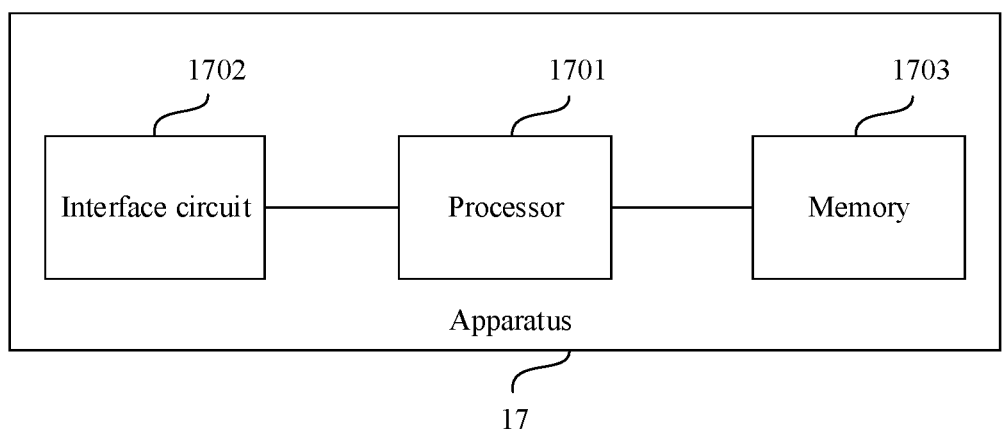
FIG. 17 is a schematic structural diagram of an apparatus according to an embodiment of this application.

FIG. 17 is a schematic structural diagram of an apparatus 17 according to an embodiment of this application. The apparatus 17 shown in FIG. 17 may be a radar apparatus, or may be a chip or a circuit that can implement a function of the radar apparatus. For example, the chip or the circuit may be disposed in the radar apparatus. The apparatus 17 shown in FIG. 17 may include a processor 1701 (for example, the processing unit 1401 may be implemented by using the processor 1501, and the processor 1501 and the processor 1701 may be, for example, a same component) and an interface circuit 1702 (for example, the transceiver unit 1402 may be implemented by using the interface circuit 1702, and the interface circuit 1702 and both the transmitter 1502 and the receiver 1503 are, for example, a same component). The processor 1701 may enable the apparatus 17 to implement the steps performed by the radar apparatus in the method provided in the embodiment shown in FIG. 8 or FIG. 13. Optionally, the apparatus 17 may further include a memory 1703. The memory 1703 may be configured to store instructions. By executing the instructions stored in the memory 1703, the processor 1701 enables the apparatus 17 to implement the steps performed by the radar apparatus in the method provided in the embodiment shown in FIG. 8 or FIG. 13.

Further, the processor 1701, the interface circuit 1702, and the memory 1703 may communicate with each other by using an internal connection path, to transfer a control signal and/or a data signal. The memory 1703 is configured to store a computer program. The processor 1701 may invoke the computer program from the memory 1703 and run the computer program, to control the interface circuit 1702 to receive a signal or send a signal, to implement the steps performed by the radar apparatus in the method provided in the embodiment shown in FIG. 8 or FIG. 13. The memory 1703 may be integrated into the processor 1701, or may be disposed separately from the processor 1701.

Optionally, if the apparatus 17 is a device, the interface circuit 1702 may include a receiver and a transmitter. The receiver and the transmitter may be a same component, or may be different components. When the receiver and the transmitter are the same component, the component may be referred to as a transceiver.

Optionally, if the apparatus 17 is a chip or a circuit, the interface circuit 1702 may include an input interface and an output interface. The input interface and the output interface may be a same interface, or may be different interfaces.

Optionally, if the apparatus 17 is a chip or a circuit, the apparatus 17 may not include the memory 1703, and the processor 1701 may read instructions (a program or code) in a memory outside the chip or the circuit, to implement the steps performed by the first radar detection apparatus in the method provided in the embodiment shown in FIG. 9 or FIG. 13.

Optionally, if the apparatus 17 is a chip or a circuit, the apparatus 17 may include a resistor, a capacitor, or another corresponding functional component, and the processor 1701 or the interface circuit 1702 may be implemented by using a corresponding functional component.

In an implementation, it may be considered that the function of the interface circuit 1702 is implemented by using a transceiver circuit or a special-purpose transceiver chip. The processor 1701 may be considered to be implemented by using a dedicated processing chip, a processing circuit, a processor, or a general-purpose chip.

In another implementation, it may be considered to implement the radar apparatus provided in this embodiment of this application by using a general-purpose computer. To be specific, program code for implementing functions of the processor 1701 and the interface circuit 1702 is stored in the memory 1703, and the processor 1701 implements the functions of the processor 1701 and the interface circuit 1702 by executing the program code stored in the memory 1703.

Functions and actions of the modules or units in the apparatus 17 listed above are merely examples for description. The functional units in the apparatus 17 may be configured to perform the actions or processing processes performed by the radar apparatus in the embodiment shown in FIG. 8 or FIG. 13. To avoid repetition, detailed descriptions are omitted herein.

In still another optional manner, when software is used to implement the radar apparatus, the radar apparatus may be implemented completely or partially in a form of a computer program product. The computer program product includes one or more computer instructions. When the computer program instructions are loaded and executed on a computer, the procedure or functions according to the embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (solid state disk, SSD)), or the like.

It should be noted that the processor included in the foregoing detection apparatus configured to perform the detection method or the signal sending method provided in the embodiments of this application may be a central processing unit (CPU), a general-purpose processor, a digital signal processor (digital signal processing, DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of a DSP and a microprocessor.

Method or algorithm steps described in combination with the embodiments of this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk drive, a removable hard disk drive, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a detection apparatus. Certainly, the processor and the storage medium may alternatively exist in the detection apparatus as discrete components.

It can be understood that FIG. 14 to FIG. 17 only shows simplified designs of the radar apparatus. In an actual application, the radar apparatus may include any quantity of transmitters, receivers, processors, controllers, memories, and another element that may exist.

An embodiment of this application further provides a communications system. The communications system includes a communications apparatus such as at least one radar apparatus and/or at least one central node mentioned in the foregoing embodiments of this application. The central node is configured to control driving of a vehicle and/or processing of another radar apparatus based on a transmit parameter of the at least one radar apparatus. The central node may be located in the vehicle, or in another possible location provided that the control is implemented.

The foregoing descriptions about implementations allow a person skilled in the art to clearly understand that, for the purpose of convenient and brief description, division of the foregoing functional modules is taken as an example for illustration. In an actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example.

For example, the module or unit division is merely logical function division. In actual implementation, another division manner may be used. For example, a plurality of units or components may be combined or integrated into another apparatus, or some features may be ignored or not performed. In addition, the displayed or discussed mutual couplings or direct couplings or communications connections may be implemented through some interfaces. The indirect couplings or communications connections between the apparatuses or units may be implemented in electrical, mechanical, or other forms.

The units described as separate parts may or may not be physically separate, and parts displayed as units may be one or more physical units, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk drive, a ROM, a RAM, a magnetic disk, or an optical disc.

Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A signal transmission method performed by a radar apparatus having a plurality of transmit antennas consecutively numbered based on an order of their physical locations, the method comprising:
dividing the plurality of transmit antennas into at least two transmit antenna groups before each transmission of a signal by the at least two transmit antenna groups,
wherein each transmit antenna group among the at least two transmit antenna groups comprises at least two transmit antennas in a virtual antenna array, and
wherein the at least two transmit antennas in each transmit antenna group have nonconsecutive numbers in the consecutively numbered transmit antennas so as to maximize a phase jump between transmitter elements of the virtual antenna array; and
sending signals by using the at least two transmit antenna groups,
wherein each of the at least two transmit antenna groups sends signals in a time division multiplexing (TDM) manner with respect to each other, and wherein the at least two transmit antennas in each of the at least two transmit antenna groups send signals in a code division multiplexing (CDM) manner.

2. The method according to claim 1, wherein at least two of the at least two transmit antenna groups share a transmit antenna.

3. The method according to claim 1, wherein the CDM manner uses binary phase shift keying (BPSK) or quadrature phase shift keying (QPSK).

4. The method according to claim 1, wherein dividing the plurality of transmit antennas into the at least two transmit antenna groups of the radar apparatus comprises randomly determining transmission antennas belonging to each group of the at least two transmit antenna groups from among the plurality of transmit antennas.

5. The method according to claim 1, wherein dividing the at least two transmit antenna groups is based on a first grouping manner associated with optimizing a performance parameter that indicates velocity ambiguity resolution performance.

6. The method according to claim 1, wherein a quantity of transmit antennas in each of the at least two transmit antenna groups is the same.

7. A signal processing method, applied to a radar apparatus having a plurality of transmit antennas consecutively numbered based on an order of their physical locations, wherein the plurality of transmit antennas comprise at least two transmit antenna groups and at least one receive antenna determined before each transmission of a signal by the at least two transmit antenna groups, the method comprising:
determining at least two groups of detection information based on at least one signal received by the at least one receive antenna,
wherein each of the at least two groups of detection information is associated with one of the at least two transmit antenna groups,
wherein each of the at least two transmit antenna groups comprises at least two transmit antennas in a virtual antenna array, and
wherein the at least two transmit antennas in each of the at least two transmit antenna groups have nonconsecutive numbers in the consecutively numbered transmit antennas so as to maximize a phase jump between transmitter elements of the virtual antenna array; and
sending signals by using the at least two transmit antenna groups;
wherein each of the at least two transmit antenna groups sends signals in a time division multiplexing (TDM) manner with respect to each other, and
wherein the at least two transmit antennas in each of the at least two transmit antenna groups send signals in a code division multiplexing (CDM) manner;
determining at least three pieces of detection information based on the at least two groups of detection information,
wherein the at least three pieces of detection information are used to determine a velocity estimation value of a target, and
wherein each of the at least three pieces of detection information is associated with each of at least three transmit antennas; and
determining a real velocity of the target based on a first velocity ambiguity multiple and the velocity estimation value of the target,
wherein the first velocity ambiguity multiple is one of at least two velocity ambiguity multiples associated with the at least two groups of detection information.

8. The method according to claim 7, wherein determining the at least two groups of detection information based on the signal received by the at least one receive antenna comprises:
separately converting the signal into at least two groups of signals in a range-Doppler domain to obtain the at least two groups of detection information,
wherein the at least two groups of signals are signals associated with the at least two transmit antenna groups.

9. An apparatus comprising:
at least one processor configured to determine at least two transmit antenna groups of a plurality of transmit antennas consecutively numbered based on an order of their physical locations;
each of the at least two transmit antenna groups comprises at least two transmit antennas in a virtual antenna array;
each of the at least two transmit antenna groups is configured to send signals in a time division multiplexing (TDM) manner with respect to each other; and
any two transmit antennas in each transmit antenna group have nonconsecutive numbers in the consecutively numbered transmit antennas so as to maximize a phase jump between transmitter elements of the virtual antenna array,
wherein each of the at least two transmit antennas in the at least two transmit antenna groups sends signals in a code division multiplexing (CDM) manner.

10. The apparatus according to claim 9, wherein at least two of the at least two transmit antenna groups include a common transmit antenna.

11. The apparatus according to claim 9, wherein the CDM manner uses binary phase shift keying (BPSK) or quadrature phase shift keying (QPSK).

12. The apparatus according to claim 9, wherein the at least one processor is further configured to randomly determine the at least two transmit antenna groups for each transmission.

13. The apparatus according to claim 9, wherein the at least one processor is further configured to: determine, for each transmission, the at least two transmit antenna groups based on a first grouping manner associated with an optimal performance parameter that indicates velocity ambiguity resolution performance.

14. The apparatus according to claim 13, wherein determining the at least two transmit antenna groups comprises all possible grouping manners of the antennas.

15. The apparatus according to claim 9, wherein each of the at least two transmit antenna groups shares a quantity of transmit antennas with another one of the at least two transmit antenna groups.

16. An radar apparatus having a plurality of transmit antennas consecutively numbered based on an order of their physical locations, the radar apparatus comprising:
a memory configured to store instructions; and
a processor configured to execute the instructions, so that the radar apparatus or a device on which the radar apparatus is installed performs a method of:
dividing the plurality of transmit antennas into at least two transmit antenna groups before each transmission of a signal by the at least two transmit antenna groups, wherein each transmit antenna group among the at least two transmit antenna groups comprises at least two transmit antennas in a virtual antenna array, wherein the at least two transmit antennas in each transmit antenna group have nonconsecutive numbers in the consecutively numbered transmit antennas so as to maximize a phase jump between transmitter elements of the virtual antenna array; and sending signals by using the at least two transmit antenna groups, wherein each of the at least two transmit antenna groups sends signals in a time division multiplexing (TDM) manner with respect to each other, and wherein the at least two transmit antennas in each of the at least two transmit antenna groups send signals in a code division multiplexing (CDM) manner.

17. The radar apparatus according to claim 16, wherein at least two of the at least two transmit antenna groups share a transmit antenna.

18. The radar apparatus according to claim 16, wherein the CDM manner uses binary phase shift keying (BPSK) or quadrature phase shift keying (QPSK).

19. The radar apparatus according to claim 16, wherein the processor is further configured to execute the instructions, so that the radar apparatus, or the device on which the radar apparatus is installed, further performs:

dividing the plurality of transmit antennas into the at least two transmit antenna groups of the radar apparatus comprises randomly determining transmission antennas belonging to each group of the at least two transmit antenna groups from among the plurality of transmit antennas.

* * * * *